(12) United States Patent
Takeshita et al.

(10) Patent No.: US 6,577,101 B1
(45) Date of Patent: Jun. 10, 2003

(54) MECHANISM FOR ASSURING PROPER LOADING OF BATTERY PACKS IN ELECTRONIC EQUIPMENT

(75) Inventors: Toshio Takeshita, Kanagawa (JP); Masaki Hanzawa, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/505,505

(22) Filed: Feb. 17, 2000

(30) Foreign Application Priority Data

Feb. 17, 1999 (JP) .......................................... 11-039291

(51) Int. Cl.[7] ................................................ H02J 7/00
(52) U.S. Cl. ..................................................... 320/112
(58) Field of Search ............................. 320/110; 429/9, 429/112; 439/374, 929, 342

(56) References Cited

U.S. PATENT DOCUMENTS

| | | | | |
|---|---|---|---|---|
| 4,515,872 A | | 5/1985 | Okano .......................... 429/65 |
| 4,810,204 A | | 3/1989 | Wilson ........................ 439/343 |
| 5,251,105 A | * | 10/1993 | Kobayashi et al. ......... 361/683 |
| 5,350,317 A | * | 9/1994 | Weaver et al. .............. 439/500 |
| 5,399,446 A | | 3/1995 | Takahashi .................... 429/90 |
| 5,415,947 A | * | 5/1995 | Matsui et al. ................. 429/1 |
| 5,510,205 A | * | 4/1996 | Ozer ............................ 429/91 |
| 5,536,590 A | * | 7/1996 | Cheiky ........................ 429/7 |
| 5,568,198 A | * | 10/1996 | Sakurai et al. .............. 348/372 |
| 5,602,454 A | * | 2/1997 | Arakawa et al. ............ 320/106 |
| 5,607,791 A | * | 3/1997 | Garcia et al. ................ 429/96 |
| 5,626,979 A | * | 5/1997 | Mitsui et al. ................ 429/97 |
| 5,630,193 A | * | 5/1997 | Miyake et al. .............. 396/539 |
| 5,648,712 A | * | 7/1997 | Hahn .......................... 320/111 |
| 5,672,441 A | | 9/1997 | Aoki et al. .................... 429/97 |
| 5,686,811 A | * | 11/1997 | Bushong et al. ............ 320/110 |
| 5,736,271 A | * | 4/1998 | Cisar et al. .................. 429/96 |
| 5,903,132 A | * | 5/1999 | Ohira et al. ................ 320/107 |

FOREIGN PATENT DOCUMENTS

| | | | |
|---|---|---|---|
| CA | WO9701871 | * | 6/1996 |
| DE | 0743689 | * | 5/1993 |
| DE | 0991131 | * | 5/1993 |
| DE | 1003231 | * | 5/1993 |
| DE | 1020940 | * | 4/1995 |
| DE | 1043786 | * | 4/1995 |
| EP | 0 572 327 A1 | | 12/1993 |
| EP | 0 588 728 A1 | | 3/1994 |
| EP | 0 676 819 A2 | | 10/1995 |
| EP | 0 836 311 A2 | | 4/1998 |

\* cited by examiner

*Primary Examiner*—Edward H. Tso
*Assistant Examiner*—Pia Tibbits
(74) *Attorney, Agent, or Firm*—Lerner, David, Littenberg, Krumholz & Mentlik, LLP

(57) ABSTRACT

A battery pack is positively prevented from being loaded in an incorrect manner in a battery loading portion inappropriate for the battery pack. To this end, the battery pack includes a battery cell, a casing housing this battery cell, and first to third output terminals outputting the power of the battery cell. The casing has a front surface on which the output terminals are arranged, and a bottom surface extending substantially at right angles to the front surface. A discriminating recess having a discriminating groove is formed at a mid portion of the bottom surface. The discriminating recess and/or discriminating groove are sized and positioned to receive the discriminating projections in some battery loading portions, but not those in other battery loading portions.

15 Claims, 22 Drawing Sheets

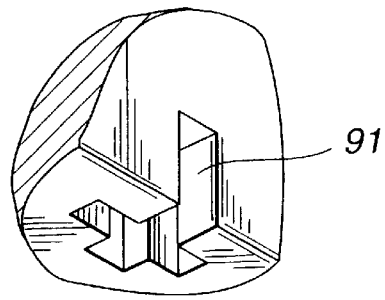
FIG.14A
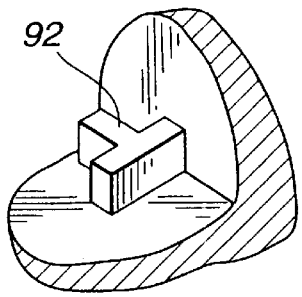  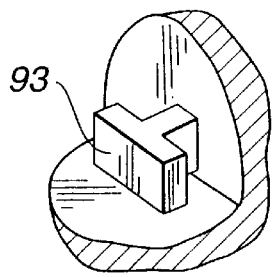  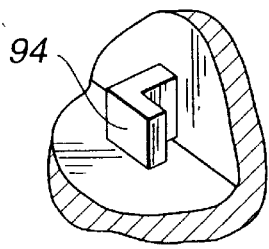
FIG.14B   FIG.14C   FIG.14D
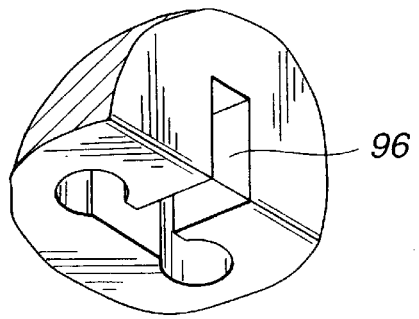
FIG.15A
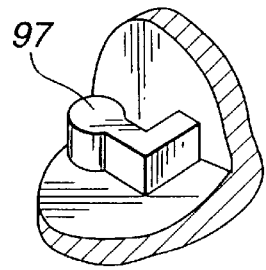   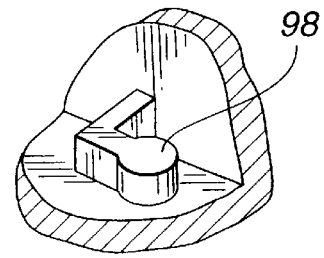
FIG.15B   FIG.15C

MECHANISM FOR ASSURING PROPER LOADING OF BATTERY PACKS IN ELECTRONIC EQUIPMENT

BACKGROUND OF THE INVENTION

This invention relates to a battery pack having housed therein a charging type battery cell used e.g., as a power source for electronic equipment, and to electronic equipment adapted to receive the battery pack.

There has hitherto been known a battery pack having therein a battery cell used as a power source for electronic equipment. This sort of battery pack is detachably loaded on a battery loading portion provided on the main body of the electronicapparatus.

The battery pack is made up of a battery cell for supplying the power, a casing having this battery cell housed therein, and an output terminal connectable to a connection terminal in the battery loading portion. The battery cell provided in the battery pack is chargeable, such that, on power depletion, it is charged through the output terminal. The battery casing has guide grooves on both lateral sides thereof engaging with the battery loading portion. The output terminal is arranged adjacent to the bottom surface of the casing so that its one end faces a longitudinal lateral side thereof.

The battery loading portion includes a loading section for loading the battery pack and a terminal for connection to the output terminal of the battery pack. The loading section is formed with a setting surface slightly larger in area than the outer size of the battery pack and on which the bottom surface of the battery pack is set. On the surfaces of the loading section facing both lateral sides of the battery pack are formed guide projections engageable in the guide grooves formed in the battery pack. The terminal section is arranged on the inner rim of the loading section for facing the output terminal of the loaded battery pack. On loading the battery pack on the loading section, the terminal section is connected to the output terminal of the battery pack to permit power to be supplied to the electronic apparatus.

With the above-described structure of the battery loading portion, the operation of loading the battery pack on the loading section of the battery loading portion is hereinafter explained. When loading the battery pack on the loading section of the battery loading portion, the respective guide projections on the loading section are engaged in the respective guide recesses with the bottom surface of the battery pack substantially parallel to the setting surface of the loading section. When loaded in the battery loading portion, the battery pack furnishes the power from the battery cell to the electronic apparatus on which the battery loading portion is provided through the connection of the output terminal of the battery pack to the terminal section in the loading section.

There are many types of battery packs having different specifications, such as charging capacity, size or shape of the casing, or the position or shape of the output terminal, depending on the objectives for use. Thus, there is a problem that the battery pack may be inadvertently loaded on a battery loading portion which is not appropriate to the battery pack in question because of differences in the specifications therebetween.

If a battery pack is inadvertently loaded in a battery loading portion not appropriate to the battery pack in question, there is a possibility of destroying the loading section, output terminal or the connection terminal. Also, if the battery pack is inadvertently loaded in an imperfect state on the loading section of the battery loading portion, there is a possibility the battery pack will become disengaged from the battery loading portion, thus leading to possible destruction of the battery pack.

It is therefore necessary to prevent the battery pack from being inadvertently loaded on battery loading portions having specifications inappropriate to the battery pack. It is similarly necessary to prevent improper loading of the battery pack on the battery loading portion.

SUMMARY OF THE INVENTION

It is therefore an object of the present invention to provide a battery pack which can be positively prevented from being inadvertently loaded on an inappropriate battery loading portion.

It is another object of the present invention to provide a battery loading portion in which loading thereon of an inappropriate power supplying device can positively be prevented from occurring.

It is still another object of the present invention to provide a power supply device which can be positively prevented from being inadvertently loaded on an inappropriate battery loading portion.

It is yet another object of the present invention to provide electronic equipment in which loading thereon of an inappropriate power supplying device can positively be prevented from occurring.

For accomplishing the above object, the battery pack according to the present invention includes a recess made up of plural steps at a mid portion of the second surface of the casing.

When the present battery pack is loaded on a battery loading portion, a projection of the battery loading portion is engaged in the recess made up of plural steps to verify whether or not the battery loading portion in question is an appropriate one for the battery pack.

The battery loading portion according to the present invention includes a projection made up of plural steps at a mid portion of the second surface.

When a power supply member is loaded on the battery loading portion, the plural steps of the projection are engaged with the power supply member to discriminate whether or not the power supply member to be loaded on the battery loading portion is appropriate for the battery loading portion.

With the power supply member according to the present invention, a recess made up of plural steps is formed at a mid portion of the second surface.

When a power supply member is loaded on electronic equipment, the plural steps of the projection are engaged with the power supply member to discriminate whether or not the power supply member being loaded is suited to the electronic equipment.

The battery pack of the present invention can be positively prevented from being erroneously loaded on an inappropriate battery loading portion.

With the battery loading portion of the present invention, a power supply member inappropriate for the device can be positively prohibited from being erroneously loaded thereon.

The power supply device of the present invention can be positively prohibited from being erroneously loaded on a battery loading portion inappropriate for the power supply device.

Also, with the electronic equipment of the present invention, a power supply member inappropriate for the equipment can be positively prohibited from being erroneously loaded thereon.

BRIEF DESCRIPTION OF THE DRAWINGS

FIGS. 14A to 14D are perspective views showing another modified discrimination recess and modified discrimination projections receivable therein.

FIGS. 15A to 15C are perspective views showing still another modified discrimination recess and modified discrimination projections receivable therein.

DETAILED DESCRIPTION

Figure 1:
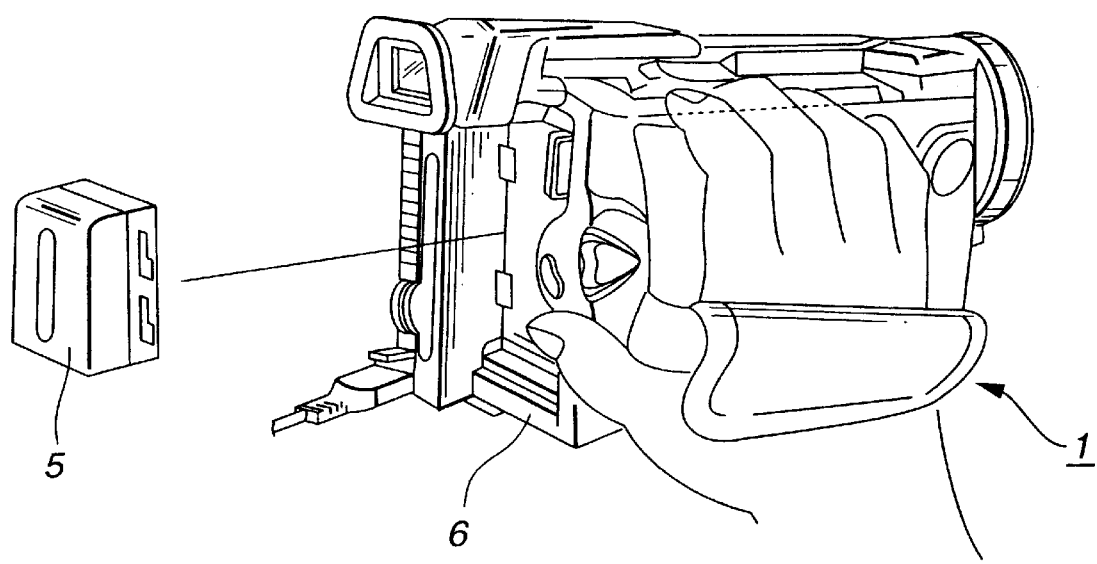
FIG. 1 is a perspective view showing a video camera apparatus having a battery loading mechanism according to the present invention.

Referring to the drawings, a battery pack and a battery loading portion having a battery loading mechanism for loading the battery pack according to the present invention will be explained in detail. It is noted that a battery pack 5 and a battery loading portion 6 having the battery loading mechanism are applied to a video camera apparatus 1, as shown for example in FIG. 1.

The battery pack 5 may be of a high capacity type, a standard capacity type, or a low capacity type, depending on the size of the charging capacity of the battery cell. The battery pack 5 may also be of the plate type adapted to be supplied with power from an external power source. There are different battery loading portions associated with these different sorts of battery packs.

Figure 2:
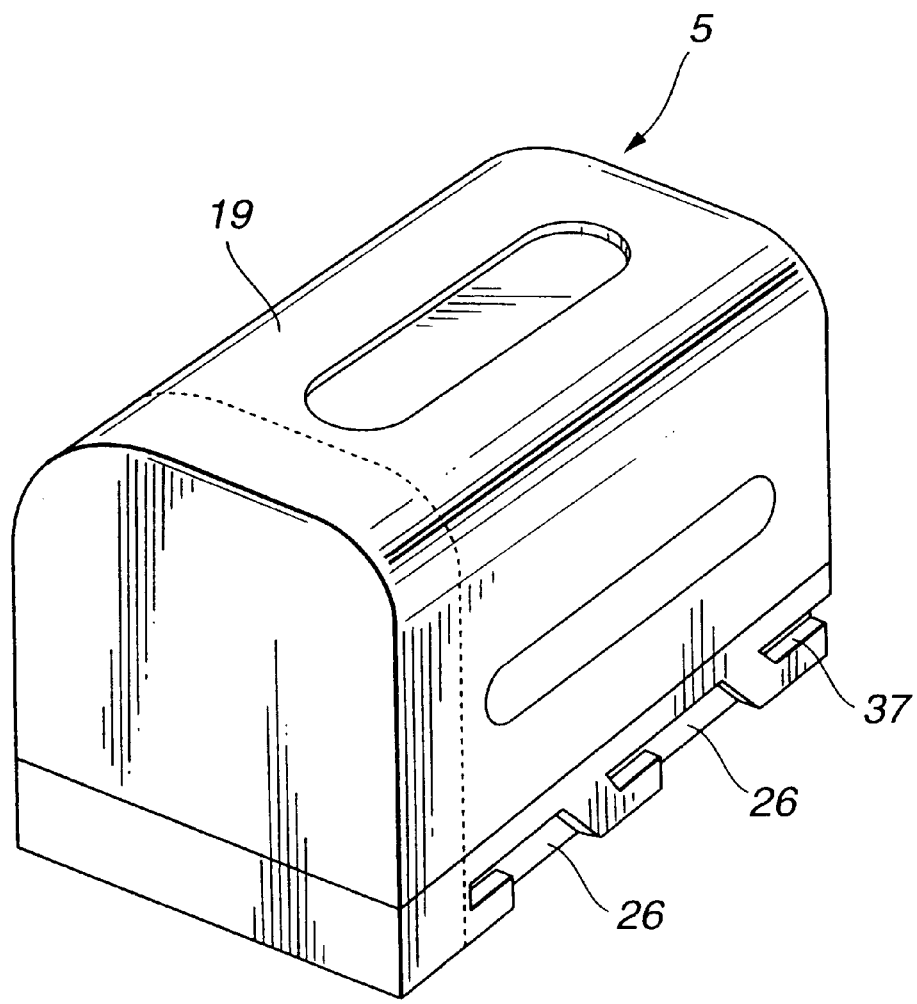
FIG. 2 is a top perspective view showing a first battery pack according to the present invention.
Figure 3:
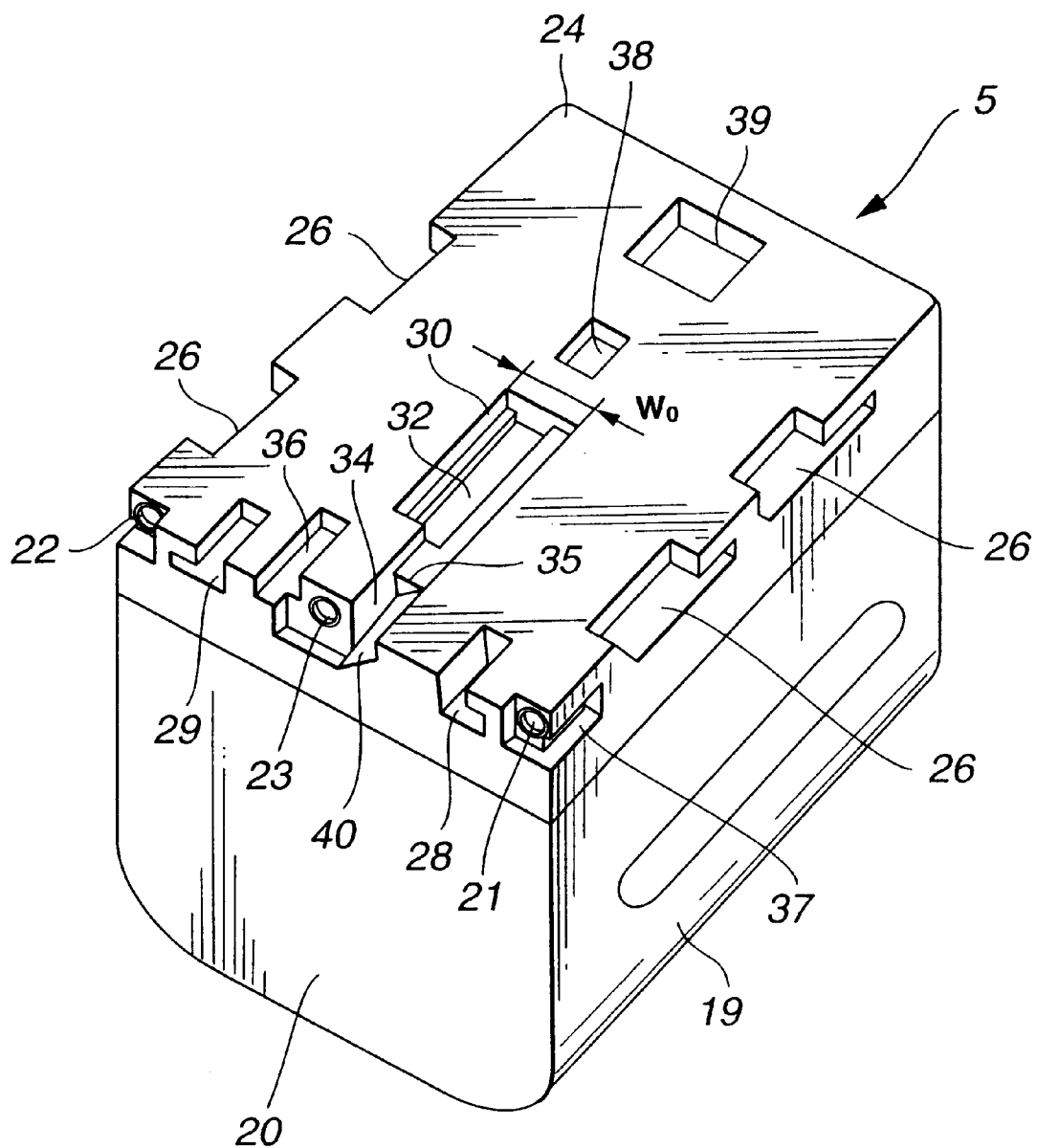
FIG. 3 is a bottom perspective view of the first battery pack.

Referring first to FIGS. 2 and 3, the first battery pack 5, used as a high capacity type, includes a battery cell, not shown, a casing 19 housing therein the battery cell, and plural output terminals 21 to 23 connected to the battery cell.

The first battery pack 5 includes a casing 19 formed of, for example, a synthetic resin material. Referring to FIGS. 2 and 3, the casing 19 has guide grooves 26, 26 on both width-wise lateral sides for guiding the casing as to the loading direction to a first battery loading portion 6. The guide grooves 26, 26 on both lateral sides of the casing 19 are opened at one end thereof on the bottom surface 24 of the casing 19 and are arrayed side-by-side in the longitudinal direction of the casing 19, as shown in FIG. 3.

On a front surface 20 of the casing 19 with respect to the direction of loading battery pack 5 to the first battery loading portion 6, there are provided a first output terminal 21 and a second output terminal 22 on both width-wise lateral sides of the casing 19. At a width-wise midportion of the front surface of the casing 19, there is provided a third output terminal 23. The first and second output terminals 21, 22 furnish the power through the battery loading portion 6 to a main body portion of the video camera apparatus 1. The third output terminal 23 outputs information signals, such as residual power of the battery cell, to the main body portion of the video camera apparatus 1. The outwardly directed ends of the output terminals 21 to 23 are positioned in substantially rectangular recesses formed in the front surface 20 of the casing 19. These recesses prevent the ends of terminals 21 to 23 from being destroyed due to abutment against structures other than the connection terminals of the battery loading portion.

The casing 19 of the first battery pack 5 is provided with a pair of control recesses 28, 29 for regulating the tilt in the width-wise direction of the bottom surface 24 of the casing 19 with respect to the first battery loading portion 6 when the casing 19 is loaded on the appropriate first battery loading portion 6 shown in FIG. 3. These control recesses 28, 29 are formed symmetrically in the front surface 20 with respect to a width-wise mid line of the battery pack 5, not shown, in the inserting direction. These control recesses 28, 29 are each provided with a first portion extending at right angles to the bottom surface 24 of the casing 19 and a second portion extending at right angles to the first portion, and hence are substantially L-shaped in cross-section, as shown in FIG. 3.

The first battery pack 5 also includes, at a mid portion in the bottom surface 24 of the casing 19, a substantially rectangular discrimination recess 30 for determining which battery loading portions are appropriate for receiving battery pack 5. The discrimination recess 30, located substantially on the width-wise centerline of the casing 19, is formed from the mid position of the bottom surface 24 of the casing 19 towards the front surface 20, as shown in FIG. 3. In the bottom surface of the discrimination recess 30, a substantially rectangular discrimination groove 32 is formed on substantially the width-wise centerline of the casing 19. The ends of groove 32 coterminate with the longitudinal ends of the discrimination recess 30. Thus, the inside of the discrimination recess 30 is formed with steps on both with-wise sides thereof. This discrimination recess 30 has a size $W_0$ in the width direction of the bottom surface 24.

The first battery pack 5 also includes a first guide groove 34, adjacent to the third output terminal 23, as shown in FIG. 3. The first guide groove 34 is formed parallel to the longitudinal direction of the casing 19 for guiding the battery pack 5 in the loading direction with respect to the first battery loading portion 6. This first guide groove 34 has one end opened in the front surface 20 of the casing 19, while its other end is a continuation of the discrimination recess 30. Adjacent to the front surface 20 of the casing 19, there is formed in the first guide groove 34 a step 35 having a different depth, that is, a different size in the direction perpendicular to the bottom surface 24 of the casing 19.

In the bottom surface 24 of the casing 19, there is formed a second guide groove 36 at the opposite side of the third output terminal 23 with respect to the first guide groove 34, as shown in FIG. 3. This second guide groove 36 is formed parallel to the longitudinal direction of the casing 19 and has one end opened in the front surface 20 of the casing 19.

In both width-wise lateral sides of the casing 19, there are formed control grooves 37, 37, adjacent to the first and second output terminals 21, 22. Control grooves 37, 37 are opened in the front surface 20 and substantially parallel to the bottom surface 24. These control grooves 37, 37 serve for regulating the tilt in the width-wise direction of the bottom surface 24 with respect to the first battery loading portion 6.

The bottom surface 24 of the casing 19 also includes a first lock recess 38 and a second lock recess 39 engaged by the first battery loading portion 6 when the casing is loaded on the first battery loading portion 6. The first lock recess 38 is substantially rectangular in profile and is located substantially on the width-wise centerline of the casing 19 adjacent to the discrimination recess 30. The second lock recess 39, slightly larger in size than the first lock recess 38, is substantially rectangular in profile and is formed on substantially the width-wise centerline of the casing 19 adjacent the back end thereof (relative to the loading direction).

Figure 4:
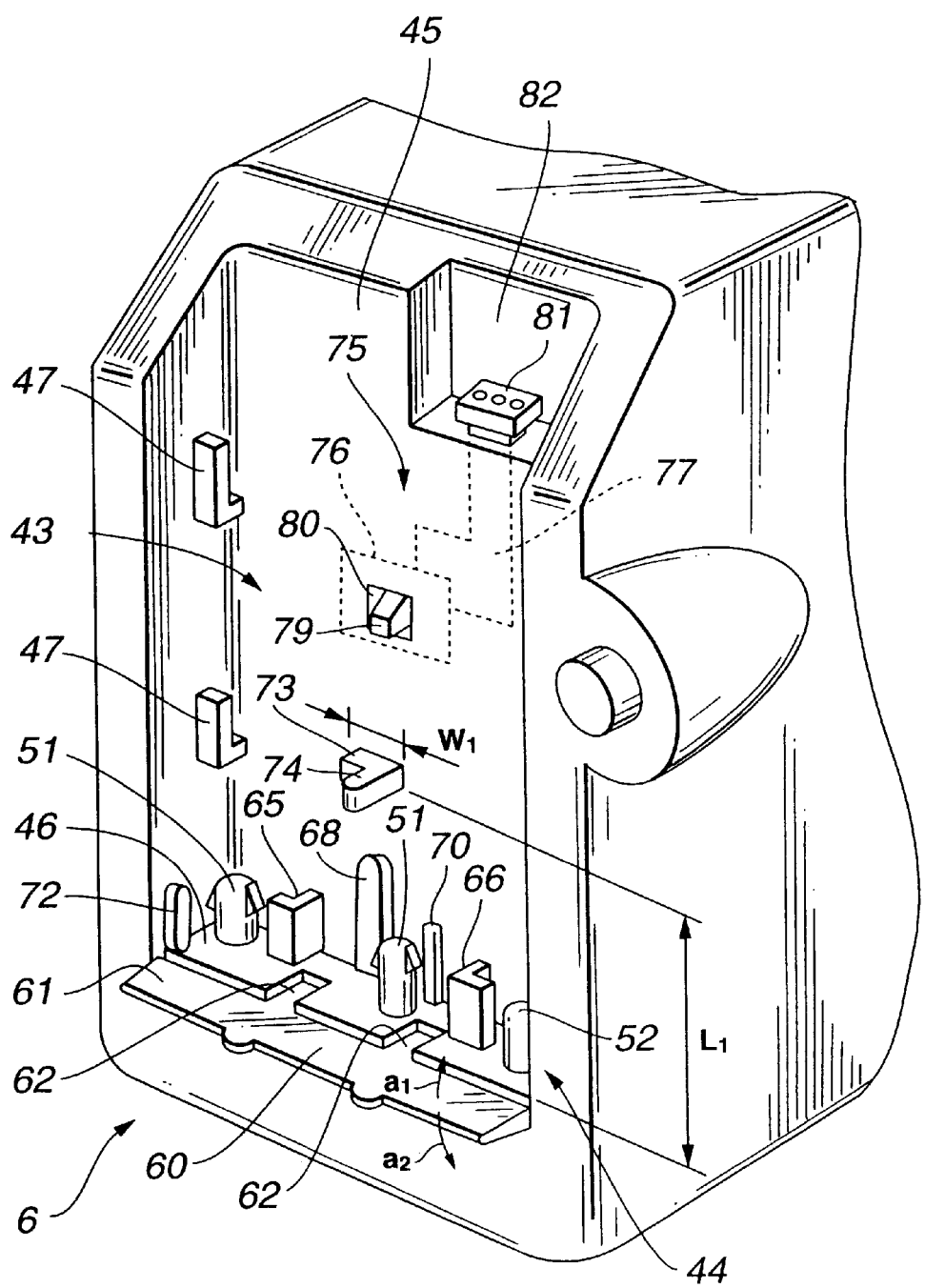
FIG. 4 is a perspective view showing a first battery loading portion of the battery loading mechanism.

The first battery loading portion 6 includes a loading section 43 having a setting surface 45 on which to set the bottom surface 24 of the battery pack 5, and a terminal section 44 to which are connected respective output terminals 21 to 23 of the first battery pack 5, as shown in FIG. 4. The loading section 43 is slightly larger in size than the bottom surface 24 of the first battery pack 5, and is formed with guide projections 47, 47 engageable with the guide grooves 26, 26 of the first battery pack 5. The guide projections 47 are formed on the inner lateral sides in the width-wise direction of the first battery pack 5, adjacent to the setting surface 45.

When the first battery pack is loaded in position, the loading section 43 sets the bottom surface 24 of the casing 19 so as to be parallel to the setting surface 45, by the guide projections 47, 47 engaging in the guide grooves 26, 26 of the casing 19, as the loading section 43 holds the first battery pack 5.

Figure 5:
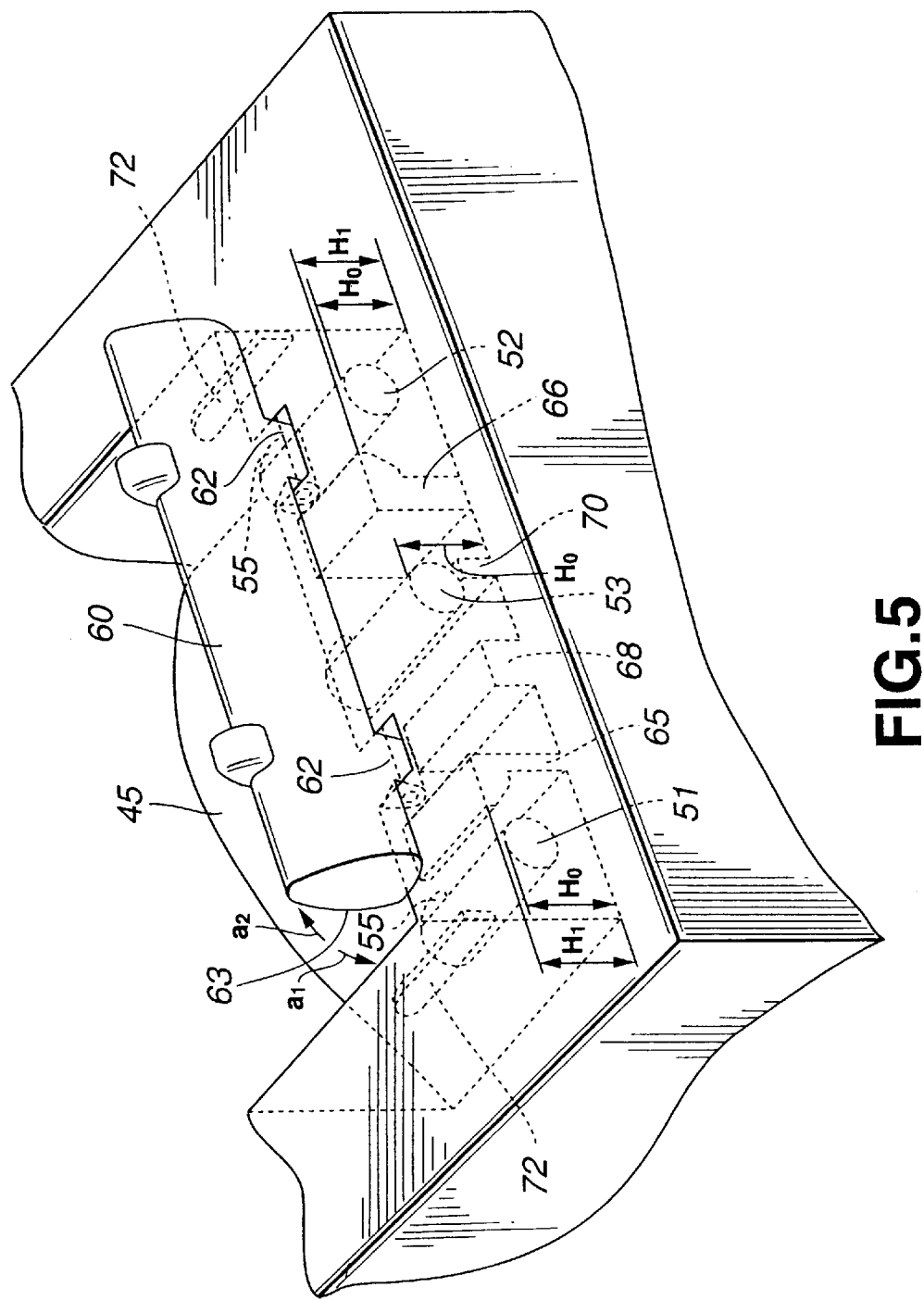
FIG. 5 is a perspective view showing a terminal section of the battery loading mechanism.
Figure 6:
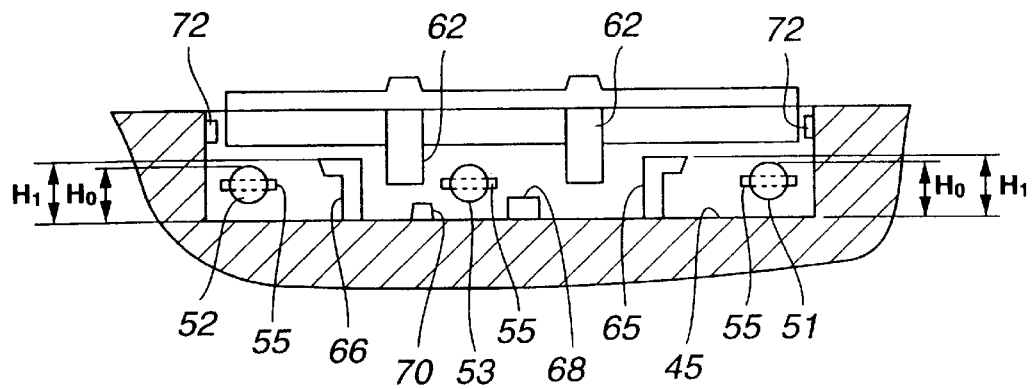
FIG. 6 is a front view showing the terminal section.

The terminal section 44 is arranged on an abutment surface 46 facing the front surface 20 of the loaded first battery pack 5, as shown in FIGS. 4 and 5. In the terminal section 44, a first connection terminal 51 and a second connection terminal 52, connected respectively to the first and second output terminals 21, 22 of the first battery pack 5, are provided on both sides along the width-wise direction of the loading section 43, as shown in FIGS. 4 and 6. Also, a third connection terminal 53, connected to the third output terminal 23 of the first battery pack 5, is located at a mid portion along the width-wise direction of the loading section 43, as shown in FIGS. 4 and 6.

The first to third connection terminals 51 to 53 are formed on the abutment surface 46 so as to be parallel to the bottom surface 24 of the first battery pack 5 and to the longitudinal direction of the first battery pack 5. Each of the first to third connection terminals 51 to 53 is provided with a terminal plate 55, projecting into each of the first to third output terminals 21 to 23 of the first battery pack 5, and a protection member 56 for protecting the terminal plate 55, as shown in FIG. 7.

The terminal plate 55 has its major surface substantially parallel to the setting surface of the loading section 43, while having its proximal end supported by the abutment surface 46 of the loading section 43. The terminal plate 55 is split into two portions by a cut-out 57 formed at its distal end so that the distal end is elastically flexible in the width-wise direction.

Figure 7:
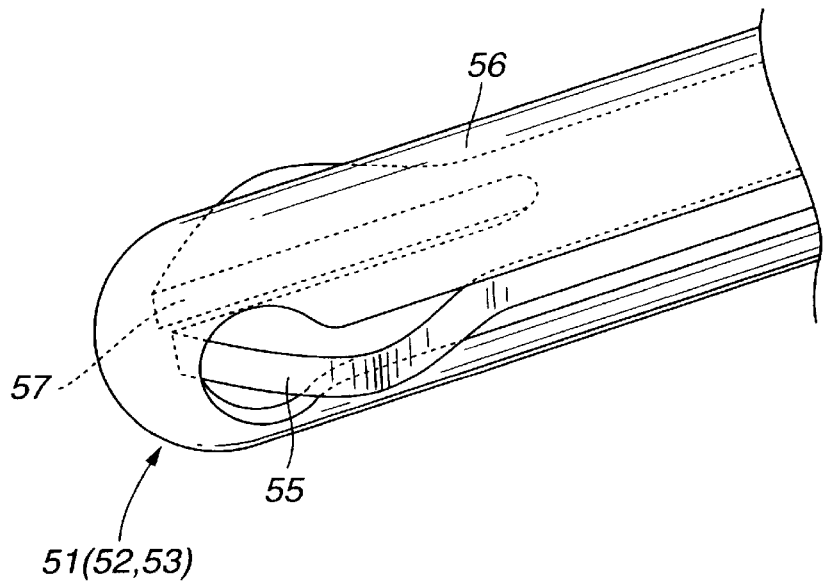
FIG. 7 is a perspective view showing a connection terminal of the terminal section.
Figure 8:
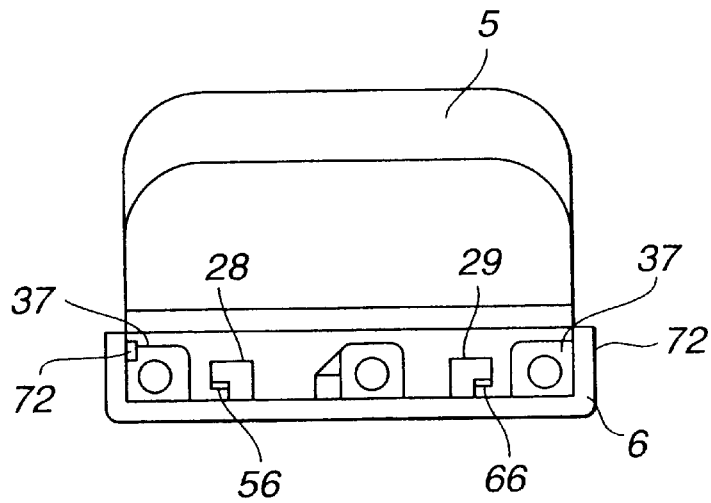
FIG. 8 is an end view looking from the terminal section, and showing the state in which, when the first battery pack is loaded in the first battery loadingportion, the first battery pack is loaded with a tilt in the longitudinal direction.

The protection member 56 is a substantially semi-tubular substrate bent at a mid portion along its length, with the terminal plate 55 in-between, as shown in FIG. 7. The distal end of the terminal plate 55 elastically and flexibly protrudes from the width-wise lateral sides of the protection member 56 at its folded distal end.

When the connection terminals 51 to 53 are inserted into the output terminals 21 to 23 of the first battery pack 5, the distal ends of the terminal plates 55 are elastically flexed in the width-wise direction to establish the electrical connection by the terminal plates 55 positively compressing against the output terminals.

The connection terminals 51 to 53 are improved in tenacity against thrusting forces from the height-wise direction of the first battery pack 5, corresponding to the depth-wise direction of the loading section 43, should the bottom surface 24 of the first battery pack 5 be erroneously abutted thereon during loading of the first battery pack 5 on the loading section 43. Thus, the terminal plates 55 may be safeguarded against inadvertent destruction.

In the terminal section 44, a cover member 60 for protecting the first to third connection terminals 51 to 53 is mounted for rotation in the direction indicated by arrows a1 and a2 in FIG. 5 relative to the loading section 43.

The cover member 60 is formed of, for example, a synthetic resin material, and includes a substantially rectangular protective piece 61 and supporting pieces 62, 62 for supporting the protective piece 61, as shown in FIGS. 5 and 6. The protective piece 61 of the cover member 60 has a surface 63 facing the setting surface 45 of the loading section 43 which is inclined in the thickness direction. As the first battery pack 5 is inserted into the loading section 43, the casing 19 is pushed against the protective piece 61 so that the cover member 60 is rotated easily in the direction indicated by arrow a2 in FIG. 5. The cover member 60 has the supporting pieces 62, 62 rotatably supported on the abutment surface 46 of the loading section 43 through a rotary pivot shaft, not shown. On the outer periphery of the rotary pivot shaft of the cover member 60, there is mounted a torsion coil spring, not shown. This torsion coil spring has one end retained by the abutment surface 46 of the loading section 43, while its other end is retained by the supporting pieces 62, 62 of the cover member 60. Thus, the cover member 60 is biased by the spring force of the torsion coil spring for rotation in the direction indicated by arrow a1 in FIG. 5 and is thereby moved to a position overlying the first to third connection terminals 51 to 53.

Thus, the connection terminals 51 to 53 are covered by the cover member 60 when the first battery pack 5 is not loaded on the loading section 43, so that the connection terminals 51 to 53 are positively protected against possible destruction.

Also, the loading section 43 of the first battery loading portion 6 is integrally formed with a pair of control projections 65, 66 astride the abutment surface 46 and the setting surface 45 in positions substantially symmetrical with respect to the width-wise centerline of loading section 43. These control projections 65, 66, engageable with the control recesses 28, 29 of the first battery pack 5, are provided adjacent to the first and second connection terminals 51, 52, as shown in FIGS. 5 and 6.

These control projections 65, 66 are each provided with a first portion perpendicular to the setting surface 45, and a second portion perpendicular to the first portion, and hence each is formed with a substantially L-shaped cross-section. These control projections 65, 66 prevent the bottom surface 24 of the first battery pack 5 from assuming an orientation inclined obliquely relative to the setting surface 45 of the loading section 43. The control projections 65, 66 are configured so that the height $H_1$ thereof in a direction perpendicular to the setting surface 45 (FIG. 5) is greater than the height Ho of the outer periphery of the connection terminals 51 to 53. Thus, the control projections 65, 66 prohibit the outer periphery of the casing 19 from erroneously abutting against the connection terminals 51 to 53 when the first battery pack 5 is inserted from a direction perpendicular to the setting surface 45, thereby preventing possible destruction of the connection terminals 51 to 53. Also, as a result of their substantially L-shaped cross-section, the control projections 65, 66 exhibit sufficient toughness. Further, the connection terminals 51 to 53 can be protected if the control projections 65, 66 are of a height substantially equal to that of the outer periphery of the connection terminals 51 to 53.

The loading section 43 of the first battery loading portion 6 is also integrally formed with a first guide projection 68 astride the abutment surface 46 and the setting surface 45 for guiding the insertion of the first battery pack 5. The first guide projection 68 is formed adjacent to the third connection terminal 53 so as to be parallel to the longitudinal direction of the setting surface 45. In this position, the first guide projection 68 is engageable in the first guide groove 34 in the bottom surface 24 of the loaded first battery pack 5.

The loading section 43 is also integrally formed with a second guide projection 70 astride the abutment surface 46 and the setting surface 45. The second guide projection 70 is oriented parallel to the longitudinal direction of the setting surface 45 for guiding the loading direction of the first battery pack 5, as shown in FIGS. 4 to 6. This second guide projection 70 is engageable with the second guide groove 36 of the first battery pack 5 to guide the loading direction.

The loading section 43 of the first battery loading portion 6 is integrally formed on both width-wise lateral sides with control pawls 72, 72 adapted for engaging with the control grooves 37, 37 of the first battery pack 5. These control grooves 37, 37 are parallel to the setting surface 45, while extending parallel to the longitudinal direction of the first battery pack 5.

The loading section 43 of the first battery loading portion 6 is formed substantially centrally of the setting surface 45 with a discrimination projection 73, as shown in FIG. 4, which is engageable with the discrimination recess 30 of the first battery pack 5. This discrimination projection 73 is formed substantially in a rectangular profile. The distal end of the discrimination projection 73 has a discrimination lug 74 projecting therefrom which is engageable in the discrimination groove 32 of the discrimination recess 30. This discrimination projection 73 has a size $W_1$ in the width-wise direction of the setting surface 45 which is smaller than the width $W_0$ of the discrimination recess 30 of the first battery pack 5 so that the projection 73 can be inserted into the discrimination recess 30. The discrimination projection 73 also is formed at a distance $L_1$ from the abutment surface 46, as shown in FIG. 4.

As shown in FIG. 4, the loading section 43 of the first battery loading portion 6 is provided with a lock mechanism 75 adapted for holding the first battery pack 5 when the battery pack 5 is loaded in position. This lock mechanism 75 includes a substantially flat-plate-shaped lock member 76 engageable with the first battery pack 5, an operating lever 77 for causing the movement of the lock member 76 relative to the setting surface 45, and a coil spring, not shown, for biasing the operating lever 77 in a direction of engaging with the first lock recess 38 of the first battery pack 5.

The lock member 76 is formed on its major surface with an upstanding lock pawl 79 engageable with the first lock recess 38 of the first battery pack 5. The lock pawl 79 projects through an opening 80 formed in the setting surface 45 substantially centrally of the loading section 43.

The operating lever 77 has its distal end engaged with the lock member 76, while having its other end integrally formed with an operating piece 81 adapted to perform a thrusting operation. The setting surface 45 is formed with an operating recess 82 positioned to be adjacent the back end of the first battery pack 5 when the battery pack is loaded in the loading section 43. An operating piece 81 protrudes into the operating recess 82. Movement of the lock member 76 results in movement of the operating level 77, thereby causing the operating piece 81 to extend outwardly into the operating recess 82.

When the first battery pack 5 is loaded in a loading section 43 having the above-described lock mechanism 75, the lock pawl 79 of the lock member 76 becomes engaged in the first lock recess 38 to prevent the movement of the first battery pack 5, thereby holding the first battery pack 5 in the loading section 43. In the lock mechanism 75, the operating piece 81 of the operating lever 77 extends into the operating recess 82 as the lock pawl 79 projects outwardly from the opening 80.

To remove the first battery pack 5 from the loading section 43, the lock pawl 79 must be disengaged from the lock recess 38 by thrusting the operating piece 81 of the operating lever 77. Once the lock pawl 79 is disengaged from the lock recess 38, the first battery pack 5 is movable relative to the loading section 43 and may be dismounted.

The above-described lock mechanism 75 is configured so that the lock pawl 79 of the lock member 76 is engageable in the first lock recess 38 of the first battery pack 5. Alternatively, the lock pawl 79 may be configured to be engageable in the second lock recess 39 by a design change of the loading section 43.

The operation of loading the above-described first battery pack 5 in the first battery loading portion 6 will now be explained with reference to the drawings.

Figure 9:
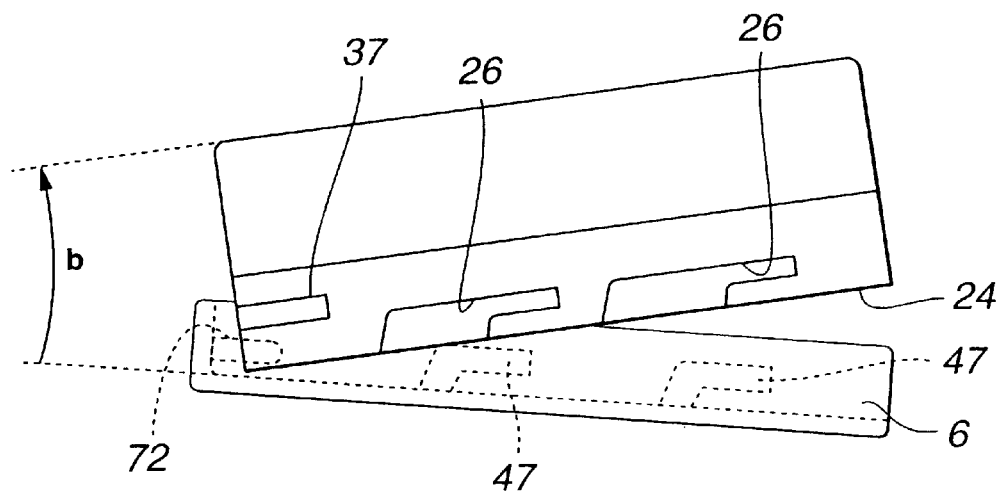
FIG. 9 is a side view showing the state in which, when the first battery pack is loaded in the first battery loading portion, the first battery pack is loaded with a tilt in the longitudinal direction.

First, if the first battery pack 5 is improperly loaded into the loading section 43 of the first battery loading portion 6, with the bottom surface 24 of the casing 19 being tilted in the direction indicated by arrow b in FIG. 9 corresponding to the longitudinal direction of the bottom surface 24, the bottom surface 24 of the casing 19 will be abutted against the guide projections 47, while the front surface 20 of the casing 19 will be abutted against the control projections 65, 66. This prevents insertion of the battery pack. Moreover, the output terminals 51 to 53 and the connection terminals 21 to 23 are positively protected from contact with other structures. Therefore, the output terminals 51 to 53 and the connection terminals 21 to 23 are positively safeguarded against possible destruction.

The first battery pack 5 is loaded properly on the first battery loading portion 6 by inserting the guide projections 47 of the loading section 43 into the respective guide grooves 26 of the casing 19. Specifically, the amount of longitudinal tilting of the bottom surface 24 of the casing 19 relative to the setting surface 45 of the loading section 43 is positively controlled, as indicated by arrow b in FIG. 9, so that the longitudinal direction of the bottom surface 24 is parallel to the setting surface 45.

If the first battery pack 5 is loaded in the first battery loading portion 6 by applying an extremely large force as the bottom surface 24 of the casing 19 is tilted, and if a large external force to detach the first battery pack 5 is applied, the output terminals 51 to 53 and the connection terminals 21 to 23 are positively safeguarded against possible destruction, since the large external force is applied to the substantially L-shaped control projections 65, 66 of higher tenacity.

Figure 10:
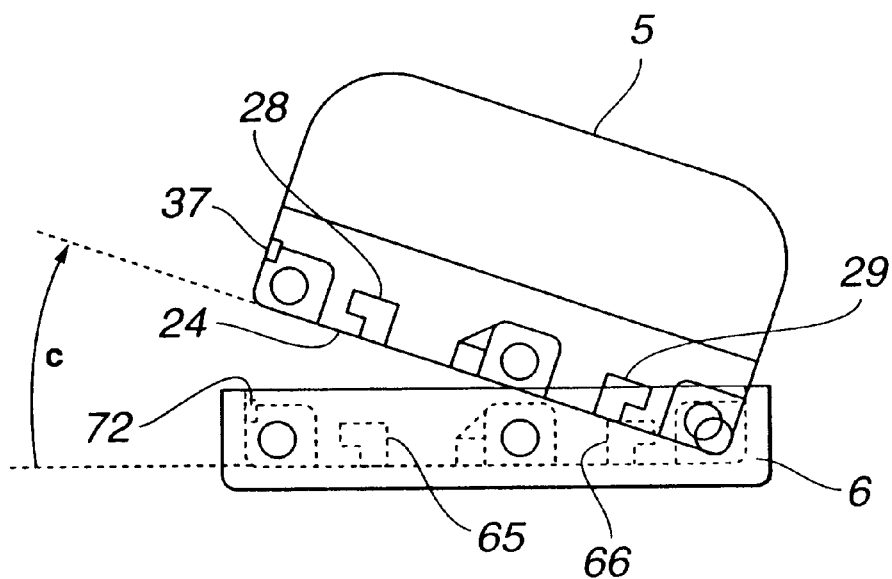
FIG. 10 is an end view looking from the terminal section, and showing the state in which, when the first battery pack is loaded in the first battery loading portion, the first battery pack is loaded with a tilt in the width-wise direction.
Figure 11:
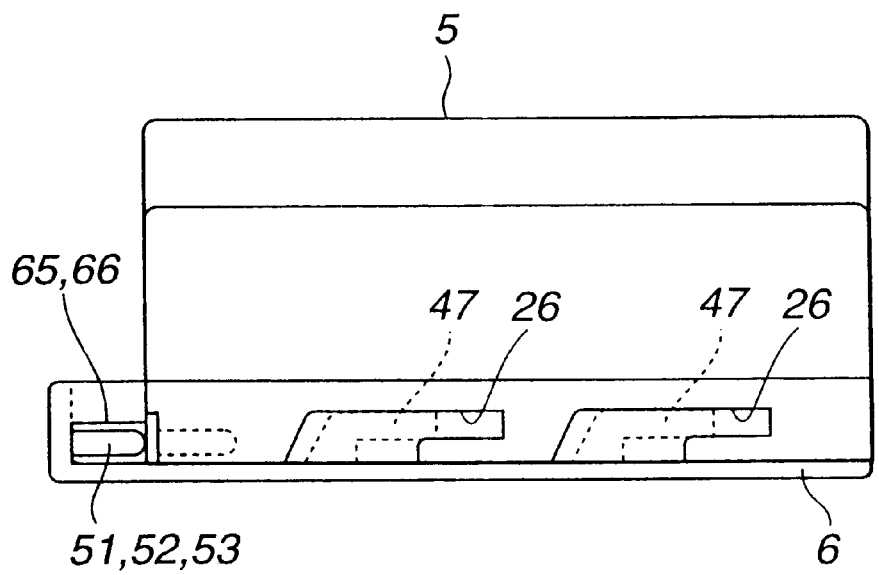
FIG. 11 is a side view showing the state in which, when the first battery pack is loaded in the first battery loading portion, the first battery pack is loaded with a tilt in the width-wise direction.

If, when the first battery pack 5 is to be loaded in the loading section 43 of the first battery loading portion 6, as shown in FIGS. 10 and 11, it is loaded improperly, with the bottom surface 24 of the casing 19 being tilted in the direction indicated by arrow c in FIG. 10 corresponding to the width-wise direction of the bottom surface 24, at least one of the control pawls 72, 72 will not be inserted into the control groove 37, with the bottom surface 24 of the casing then abutting against the control pawl 72 and with the front surface 20 of the casing 19 abutting against the control projection. Thus, in this orientation the first battery pack cannot be inserted, such that the output terminals 51 to 53 and the connection terminals 21 to 23 are positively prevented from abutting against structures other than those intended. This positively prevents destruction of the output terminals 51 to 53 and the connection terminals 21 to 23.

The control projections 65, 66 of the loading section 43 are inserted into the control recesses 28, 29 of the casing 19, whereby the state of tilt in the width-wise direction of the bottom surface 24 of the casing 19 relative to the setting surface 45 of the loading section 43 is positively controlled, with the width-wise direction of the bottom surface 24 being substantially parallel to the setting surface 45 to permit the first battery pack 5 to be loaded properly on the first battery loading portion 6.

Also, when the first battery pack 5 is being loaded in the loading section 43 of the first battery loading portion 6, the control pawls 72, 72 of the loading section 43 become engaged in the control grooves 37, 37 of the casing 19, whereby the state of tilt in the width-wise direction of the bottom surface 24 of the casing 19 relative to the setting surface 45 of the loading section 43 is positively controlled, with the width-wise direction of the bottom surface 24 being rendered substantially parallel to the setting surface 45, thereby permitting the first battery pack 5 to be properly loaded in the first battery loading portion 6.

Thus, when the first battery pack 5 is being loaded in the loading section 43 of the first battery loading portion 6, the first battery pack 5 is aligned substantially parallel to the setting surface 45 of the loading section 43. Stated differently, when the first battery pack 5 is loaded in the loading section 43 of the first battery loading portion 6, the first battery pack 5 is positively prevented from being loaded in an improper position in the loading section 43, with the bottom surface 24 of the casing 19 being tilted in the longitudinal direction or in the width-wise direction relative to the setting surface 45.

When the first battery pack 5 is loaded in the loading section 43 of the first battery loading portion 6, with the bottom surface 24 of the casing 19 set on the setting surface 45, the discrimination projection 73 of the setting surface 45 projects into the discrimination recess 30 of the bottom surface 24, at the same time as the discrimination lug 74 projects into the discrimination groove 32, whereby it is determined that the first battery pack 5 is suited to the first battery loading portion 6. When the first battery pack 5 is being loaded in the first battery loading portion 6, the first battery loading portion 6 checks whether or not the first battery pack 5 is appropriate for the first battery loading portion 6 based on whether or not the discrimination projection 73 of the setting surface 45 can be inserted into the discrimination recess 30 of the bottom surface 24, that is, based on the relative positions of the discrimination recess 30 and the discrimination projection 73, and also based on whether or not the discrimination lug 74 can be inserted into the discrimination groove 32.

Although the discrimination recess 30 and the discrimination projection 73 are discriminated from each other based on their positions in the longitudinal direction of the bottom surface 24 of the casing 19, they may also be discriminated from each other based on their positions in the width-wise direction of the bottom surface 24.

Figure 12A:
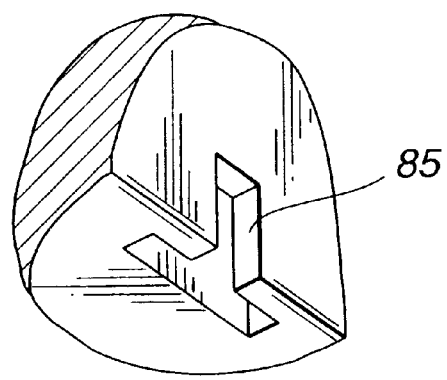
FIGS. 12A, 12B are perspective views showing a discrimination recess and a discrimination projection receivable therein.
Figure 12B:
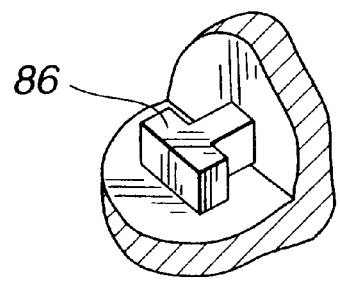
Figure 13A:
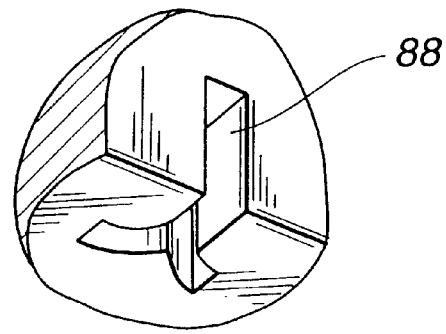
FIGS. 13A, 13B are perspective views showing a modified discrimination recess and a modified discrimination projection receivable therein.
Figure 13B:
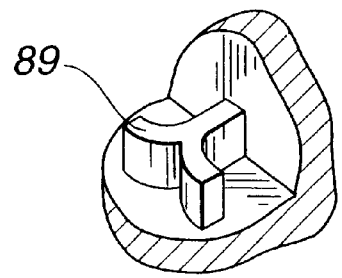

The first battery pack 5 and the first battery loading portion 6 are formed with the control recesses 28, 29 and with the control projections 65, 66 having substantially the same L-shaped cross-section. These recesses and projections may, of course, be configured as control recesses 85 and control projections 86 having substantially the same T-shaped cross-section, as shown in FIGS. 12a and 12b, or as control recesses 88 and control projections 89 having substantially the same Y-shaped cross-section, as shown in FIGS. 13a and 13b.

With the first battery pack 5 and the first battery loading portion 6, described above, the control recesses 28, 29 and the control projections 65, 66, mating with each other, are of the same profile. Alternatively, the control projections may be shaped to be engaged in portions of the groove constituting a substantially cross-shaped control recess 91, as shown in FIGS. 14a to 14d. For example, plural control projections 92 to 94 may be shaped so as to be engageable in the control recess 91. That is, the battery pack having the control recess 91 can be loaded in three different battery loading portions, that is, in battery loading portions having the control projections 92 to 94.

Alternatively, control projections engageable with portions of the substantially T-shaped control recess 96, as shown in FIGS. 15a to 15c, may be used. That is, the battery pack having the control recess 96 may be loaded in two different battery loading portions, one having the control projection 97 and one having the control projection 98.

In the above-described first battery pack 5 and the first battery loading portion 6, the control recesses 28, 29 and the control projections 65, 66 are formed symmetrically with respect to substantially the centerline in the width-wise direction of the bottom surface 24. Of course, both recesses or projections may also be formed with the same profile on either side of the width-wise centerline of the bottom surface 24.

With the battery loading portion according to the present invention, in which the state of tilt in the width-wise direction of the first battery pack 5 relative to the setting surface 45 of the loading section 43 of the first battery loading portion 6 can be controlled positively, the bottom surface 24 of the first battery pack 5 can be positively prevented from being inserted with a tilt in the width-wise direction relative to the setting surface 45 of the loading section 43. Thus, with the present battery loading portion, it is possible to prevent possible destruction of the output terminals 21 to 23 and the connection terminals 51 to 53 of the first battery pack 5 and the first battery loading portion 6.

Referring to the drawings, modifications of the battery pack and the battery loading portion according to the present invention will be explained in detail. Meanwhile, in the following description of the modifications of the battery pack and the battery loading portion, parts or components which are the same as those of the first embodiment are depicted by the same reference symbols and are not explained specifically.

Figure 16:
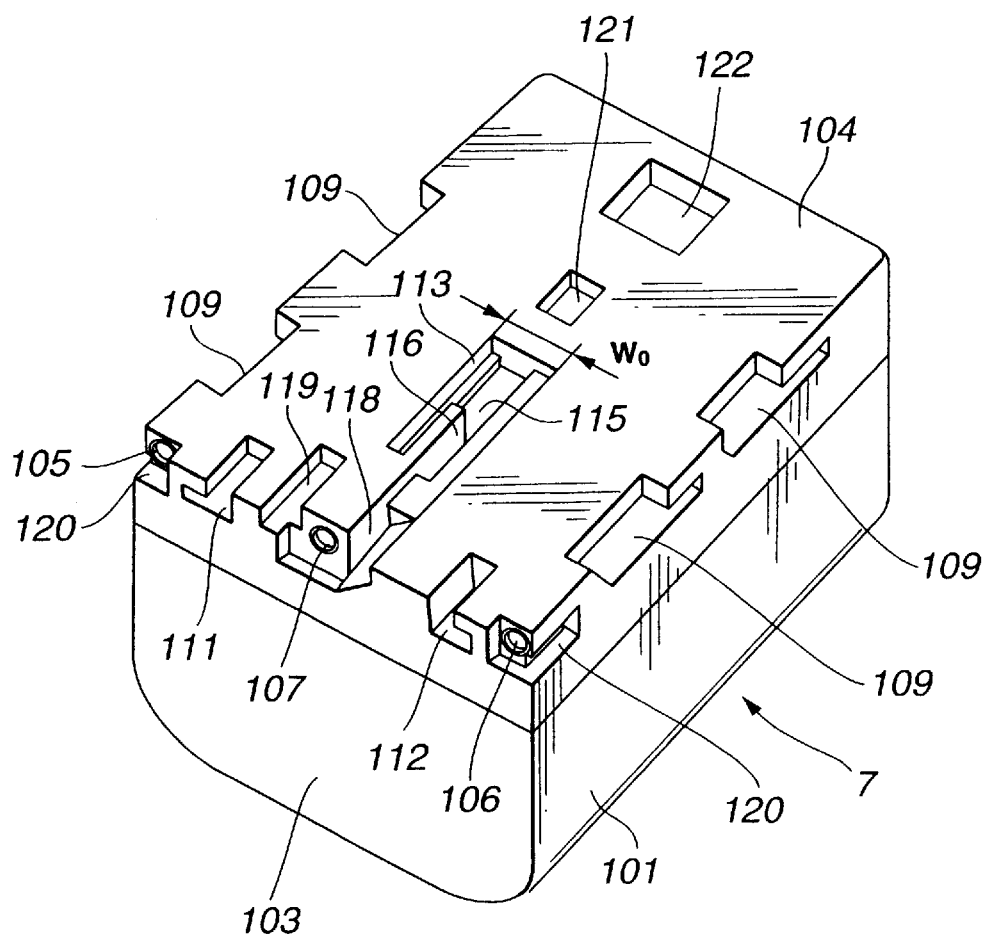
FIG. 16 is a bottom perspective view showing a second battery pack.

Referring to FIG. 16, the second battery pack 7 is of the standard charging capacity, and is of a smaller thickness than the first battery pack 5. The second battery pack 7 includes a casing 101 housing a battery cell therein, and first to third output terminals 105 to 107 provided on a front surface 103 of the casing 101 and which are connected to the battery cell. The casing 101 is formed with guide grooves 109, 109 for guiding the insertion of the second battery pack 7 into a battery loading portion. In the front surface 103 of the casing 101 of the second battery pack 7, there are formed control recesses 111, 112 for controlling the state of tilt of the bottom surface 104 in the width-wise direction relative to the battery loading portion.

At a mid portion of the bottom surface 104 of the casing 101 of the second battery pack 7, there is formed a discrimination recess 113 for discriminating whether a particular battery loading portion is appropriate for loading the second battery pack 7. In the bottom surface of the discrimination recess 113 is formed a substantially rectangular groove 115 on substantially the centerline in the width-wise direction of the casing 101, while a step is formed on each side of the discrimination recess 113 in the width-wise direction of the bottom surface 104. This discrimination recess 113 has a width $W_0$ in the width direction of the bottom surface 104. In the discrimination recess 113, essential to the second battery pack 7, there is integrally formed a discrimination lug 116 which projects parallel to the longitudinal direction of the casing 101 from the open end of the recess 113.

In the bottom surface 104 of the casing 101, there are formed a first guide groove 118 and a second guide groove 119, adjacent to the third output terminal 107, for guiding the insertion of the second battery pack 7 into the battery loading portion. In both lateral sides in the width-wise direction of the casing 101 are formed control grooves 120, 120 for controlling the tilt in the width-wise direction of the bottom surface 104 relative to the battery loading portion. The grooves 120, 120 are opened in the front surface 103 of the casing 101 and are substantially parallel to its bottom surface 104.

In the bottom surface 104 of the casing 101 are formed a first lock recess 121 and a second lock recess 122 which are engaged by the battery loading portion when the casing 101 is loaded thereon.

Figure 17:
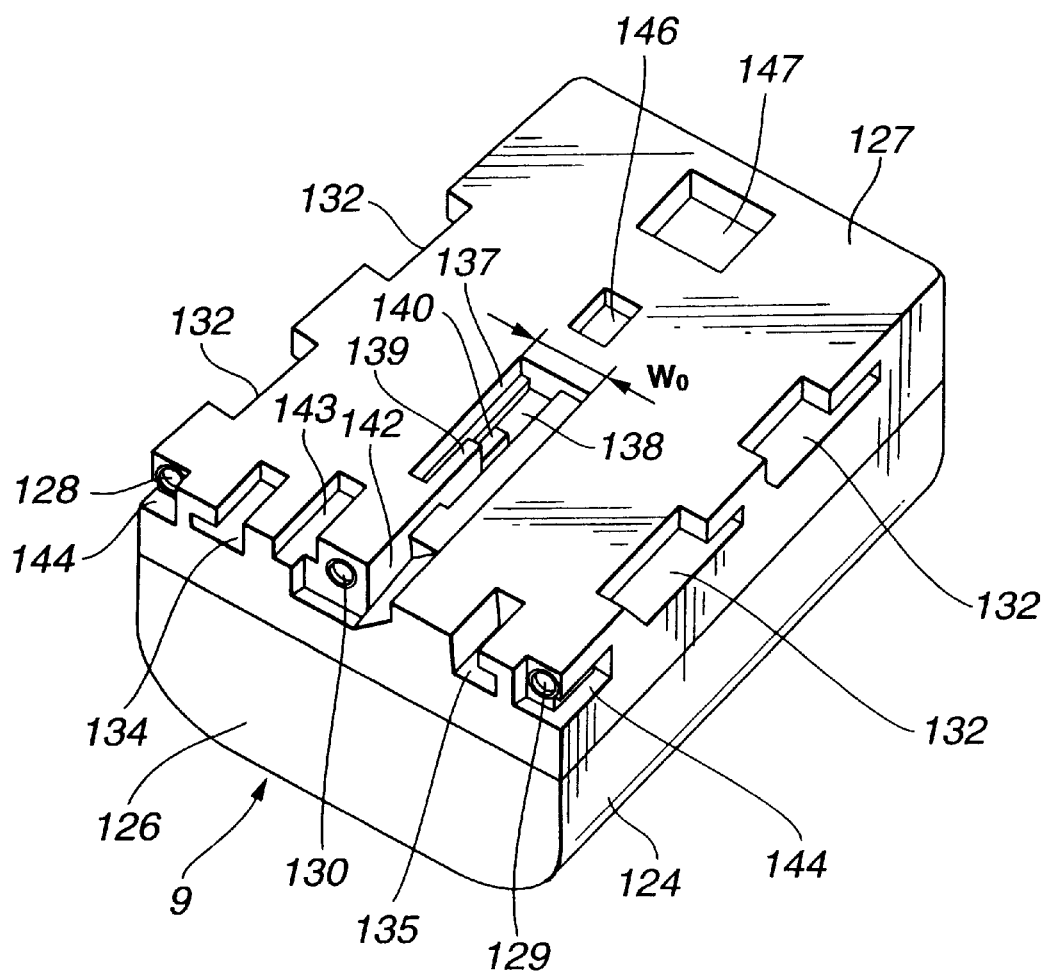
FIG. 17 is a bottom perspective showing a third battery pack.

A third battery pack 9, shown in FIG. 17, is of a low charging capacity, and is of a smaller thickness than the second battery pack 7. The third battery pack 9 includes a casing 124, housing a battery cell therein, and first to third output terminals 128 to 130, provided on a front surface 126 of the casing 124 and which are connected to the battery cell. In both lateral sides in the width-wise direction of the casing 124 are formed guide grooves 132, 132 for guiding the insertion of the third battery pack 9 into a battery loading portion.

In the front surface 126 of the casing 124 of the third battery pack 9 there are formed control recesses 134, 135, symmetrical relative to substantially the centerline in the width-wise direction of the casing 124, as shown in FIG. 17, for controlling the state of tilt in the width-wise direction of the bottom surface 127 relative to the battery loading portion when loading the casing on the appropriate battery loading portion.

At a mid portion of the bottom surface 127 of the casing 124 of the third battery pack 9 is formed a discrimination recess 137, as shown in FIG. 17, for discriminating whether a particular battery loading portion is appropriate for loading the casing 124. In the bottom surface of the discrimination recess 137 is formed a discriminating groove 138, substantially rectangular in profile, substantially on the centerline in the width-wise direction of the casing 124. A step is formed on each side of the discrimination recess 137 in the width-wise direction of the bottom surface 127. The discriminating recess 137 has a width $W_0$ parallel to the width-wise direction of the bottom surface 127.

In the discriminating recess 137, essential to the third battery pack 9, there is formed a discriminating lug 139 which protrudes from the open end of the recess 137 in a direction parallel to the longitudinal direction of the casing 124. At the free end of the discriminating lug 139 is formed a discriminating recess 140.

The casing 124 is formed with a first guide groove 142 and a second guide groove 143, both adjacent to the third output terminal 130, for guiding the insertion of the third battery pack 9 relative to the battery loading portion. In both lateral sides along the width of the casing 124 are formed control grooves 144, 144 for controlling the tilt in the width-wise direction of the bottom surface 127 relative to the battery loading portion. The control grooves 144, 144 are opened on the front surface 126 of the casing 124 and are substantially parallel to its bottom surface 127.

In the bottom surface 127 of the casing 124 are also formed a first lock recess 146 and a second lock recess 147 which are engaged by the battery loading portion when the casing is loaded thereon.

Figure 18:
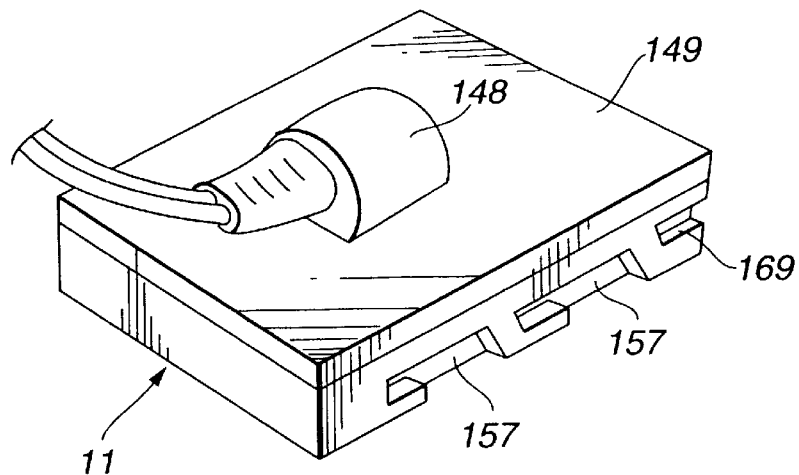
FIG. 18 is a top perspective view showing a battery plate.
Figure 19:
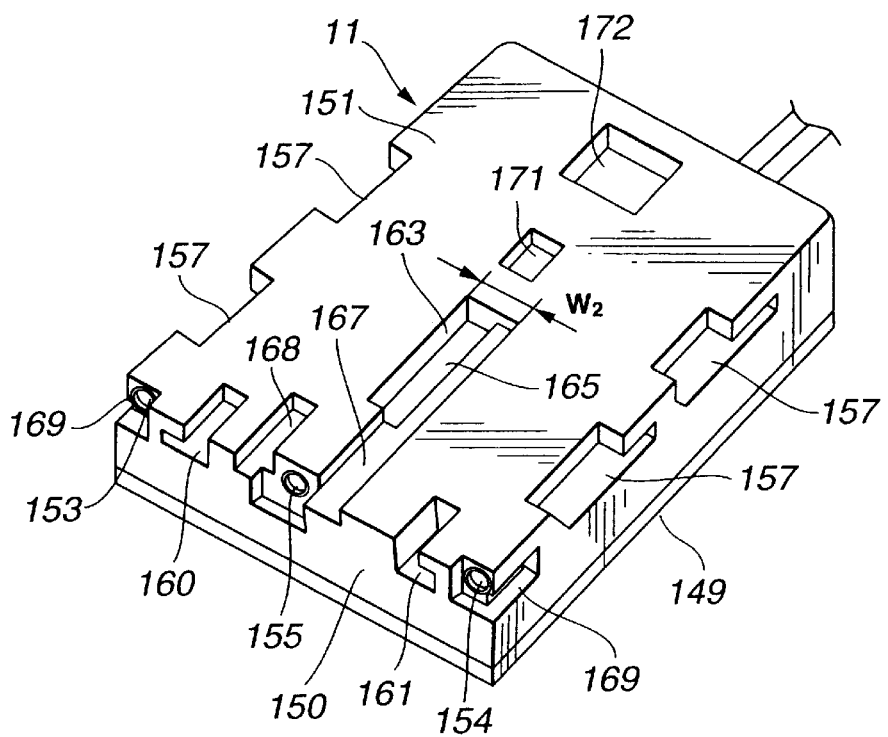
FIG. 19 is a bottom perspective view showing the battery plate of FIG. 18.

A battery plate used for connection to a further external power source, such as an AC power source for household use, is now explained by referring to the drawings. Referring to FIGS. 18 and 19, the battery plate 11 is of a substantially rectangular plate shape and includes a connection terminal section 148 for connection to a variety of external power sources, a casing 149 provided with the connection terminal section 148, and first to third output terminals 153 to 155 connected to the connection terminal section 148. The connection terminal section 148 includes a wiring cord for connection to an AC adapter, not shown.

In both lateral sides in the width-wise direction of the casing 149 are formed guide grooves 157 for guiding the casing as it is loaded on a battery loading portion. In a front surface 150 of the casing 149 of the battery plate 11, there are formed control recesses 160, 161 which are symmetrical relative to substantially the centerline in the width-wise direction of the casing as shown in FIG. 19. The control recesses 160, 161 are used for controlling the state of tilt in the width-wise direction of the bottom surface 151 of the casing 149 relative to the battery loading portion when loading the battery plate 11 on the appropriate battery loading portion.

At a mid portion of the bottom surface 151 of the casing 149 of the battery plate 11, there is formed a discriminating recess 163 for discriminating whether the battery plate 11 is appropriate for loading in the battery loading portion. In the bottom surface of the discriminating recess 163 is formed a substantially rectangular discriminating groove 165 on substantially the centerline in the width-wise direction of the casing 149. A step is formed in one side of the recess 163 in the width-wise direction of the bottom surface 151. The discriminating recess 163 has a size $W_2$ parallel to the width of the bottom surface 151 which is smaller than the width $W_0$ of each of the discriminating recesses 30, 113, 137 of the above-described battery packs 5, 7, 9.

In the bottom surface 151 of the casing 149 are formed a first guide groove 167 and a second guide groove 168, both adjacent to the third output terminal 155, for guiding the battery plate 11 as it is loaded on the battery loading portion. The first guide groove 167, which is planar and contiguous to the step in the discriminating recess 163, has a profile different from that of the first guide grooves 34, 118, 142 of the above-described battery packs 5, 7, 9.

In both lateral sides in the width-wise direction of the casing 149 are formed control grooves 169, 169 for controlling the tilt in the width-wise direction of the bottom surface 151 relative to the battery loading portion. The control grooves are opened on the front surface 150 of the casing 149 and are substantially parallel to the bottom surface 151.

In the bottom surface 151 of the casing 149 are formed a first lock recess 171 and a second lock recess 172 which are engaged by the battery loading portion on loading the battery plate 11 thereon.

The battery plate 11, constructed as described above, is loaded on an appropriate battery loading portion, and is connected via an AC adapter to an external power source or a large-sized battery, to supply the power from the external power source directly to the main body portion of the electronic apparatus.

Figure 20:
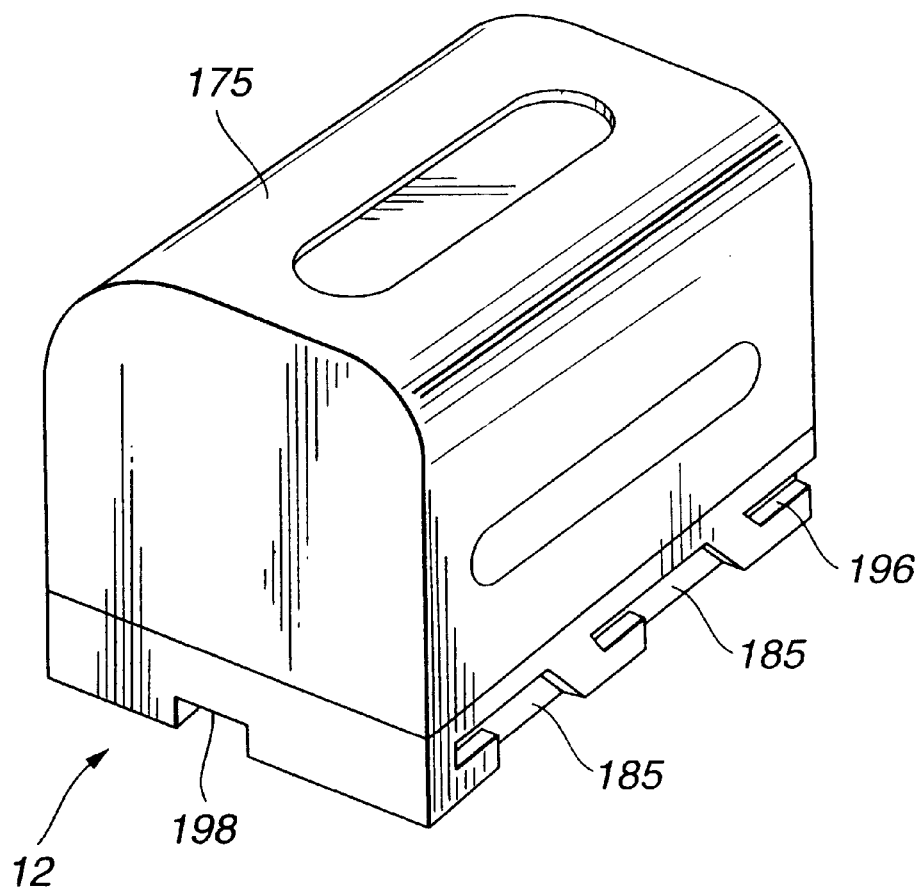
FIG. 20 is a top perspective view showing a fourth battery pack.
Figure 21:
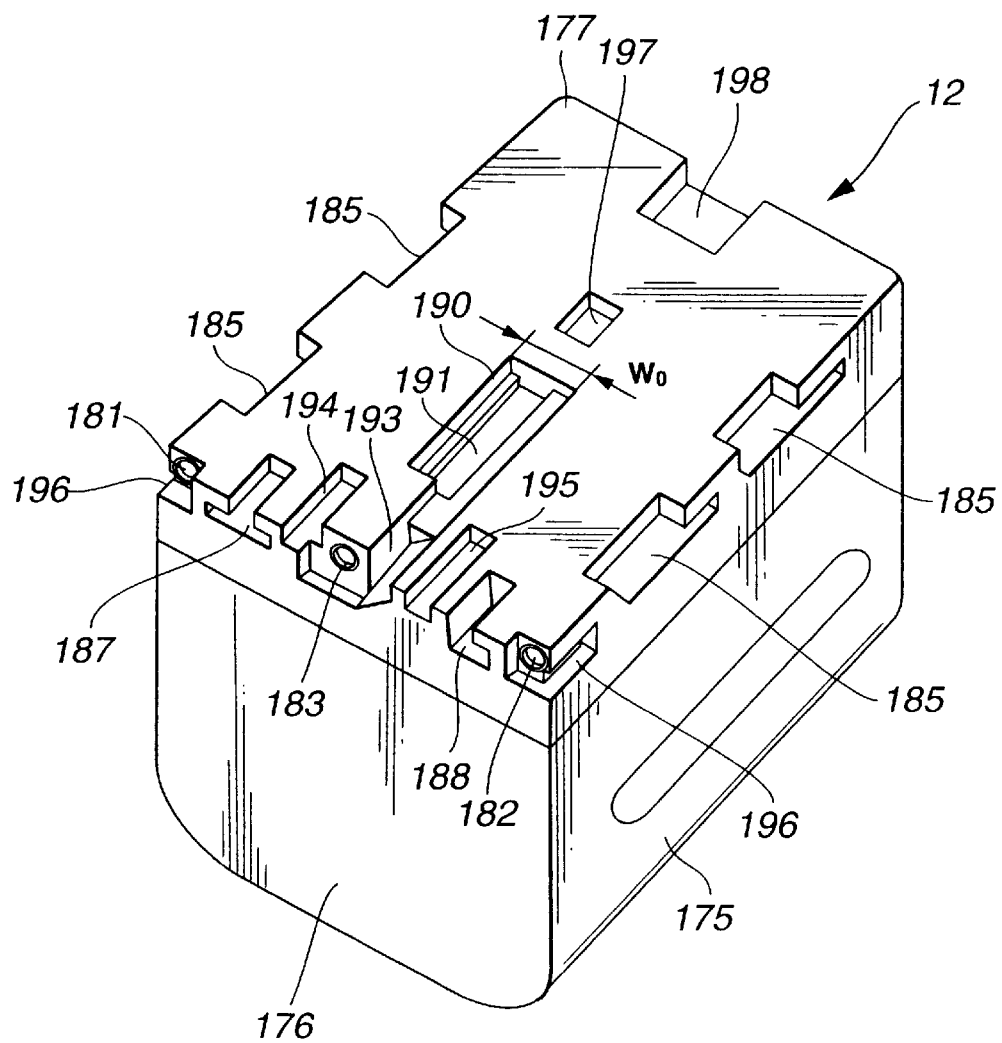
FIG. 21 is a bottom perspective view of the fourth battery pack.

A fourth battery pack 12 is configured substantially similarly to the first battery pack 5, and has a casing 175 with a bottom surface 177 of a longitudinal size smaller than the first battery pack 5. Referring to FIGS. 20 and 21, the fourth battery pack 12 is shorter at its front surface end than the first battery pack 5, as indicated by a broken line shown in FIG. 2.

This fourth battery pack 12 has a casing 175, housing therein the battery cell, and first to third output terminals 181 to 183 which are provided on the front surface 176 of the casing 175 and which are connected to the battery cell. On both lateral sides in the width-wise direction of the casing 175 are formed guide grooves 185 for guiding the fourth battery pack 12 as it is loaded on the battery loading portion.

In the front surface 176 of the casing 175 of the fourth battery pack 12 are formed control recesses 187, 188 for controlling the state of tilt in the width-wise direction of the bottom surface 177 relative to the battery loading portion when loading the battery pack on the appropriate battery loading portion. The control recesses 187, 188 are of substantially T-shaped cross-section and of substantially L-shaped cross-section, respectively.

In a mid portion of the bottom surface 177 of the casing 175 of the fourth battery pack 12, there is formed a discriminating recess 190 for discriminating whether a particular battery loading portion is appropriate for loading the fourth battery pack 12. In the bottom surface of the discriminating recess 190 is formed a substantially rectangular discriminating groove 191, substantially on the centerline in the width-wise direction of the casing 175. A step is formed on each side of the discriminating recess 190 in the width-wise direction of the bottom surface 177. The discriminating recess 190 has a width $W_0$ parallel to the width of the bottom surface 177.

Adjacent to the third output terminal 183 on the bottom surface 177 of the casing 175, there are formed a first guide groove 193 and a second guide groove 194 for guiding the fourth battery pack 12 as it is loaded in the battery loading portion. In the bottom surface 177 of the casing 175 is formed a discriminating groove 195 adjacent to the first guide groove 193 for discriminating the fourth battery pack 12 from the first battery pack 5. In both lateral sides in the width-wise direction of the casing 175 are formed control grooves 196, 196 for controlling the tilt in the width-wise direction of the bottom surface 177 relative to the battery loading portion. The grooves 196, 196 are open in the front surface 176 of the casing 175 and extend substantially parallel to the bottom surface 177.

In the bottom surface 177 of the casing 175, there are formed a first lock recess 197 and a second lock recess 198 which are engaged by the battery loading portion on loading the fourth battery pack 12 therein. The second lock recess 198 is formed so that it is open on the back surface of the casing 175.

A second battery loading portion 8, on which can be loaded the above-described first to fourth battery packs 5, 7, 9 and 12, is now explained by referring to the drawings.

Figure 22:
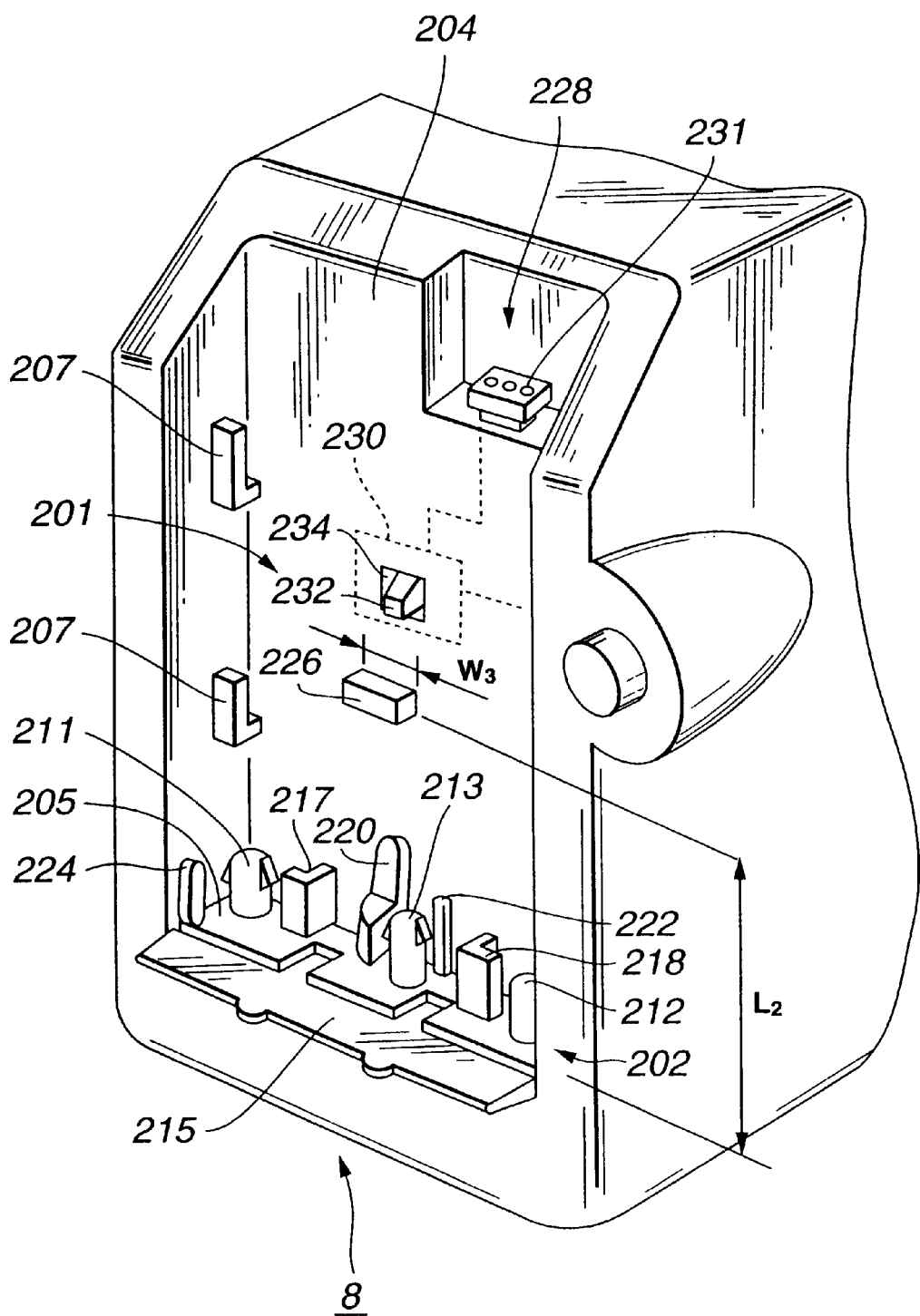
FIG. 22 is a perspective view showing a second battery loading portion.

Referring to FIG. 22, the second battery loading portion 8 includes a loading section 201, having a setting surface 204 on which to set the battery packs 5, 7, 9 and 12, and a terminal section 202 to which are connected output terminals 21, 22, 23, 105, 106, 107, 128, 129, 130, 181, 182 and 183 of the battery packs 5, 7, 9 and 12.

On both lateral sides in the width-wise direction of the setting surface 204 of the loading section 201, adjacent to the setting surface 204, there are formed guide projections 207 engageable in the guide grooves 26, 109, 132, 185 of the battery packs 5, 7, 9, 12.

The terminal section 202 is provided on an abutment surface 205 of the battery loading portion facing the front surfaces 20, 103, 126, 176 of the battery packs 5, 7, 9 and 12 when loaded thereon. The terminal section 202 is provided with first, second and third connection terminals 211, 212 and 213 to which are connectable the output terminals 21 to 23, 105 to 107, 128 to 130 and 181 to 183 of the battery packs 5, 7, 9 and 12. In the terminal section 202, a cover member 215 for protecting the connection terminals 211 to 213 is mounted for rotation with respect to the loading section 201, as shown in FIG. 22.

The loading section 201 of the second battery loading portion 8 is integrally formed with a pair of control projections 217, 218 in positions substantially symmetrical with respect to the centerline in the width-wise direction of the setting surface 204, as shown in FIG. 22. These control projections 217, 218 are provided astride the abutment surface 205 and the setting surface 204 so as to be engageable with the control recesses 28, 29, 111, 112, 134, 135, 187, 188 of the battery packs 5, 7, 9 and 12. These control projections 217, 218 are at a greater height in a direction perpendicular to the setting surface 204 than the outer peripheral parts of the connection terminals 211 to 213 to prevent possible destruction of these connection terminals 211 to 213.

The loading section 201 of the second battery loading portion 8 is also integrally formed with a first guide projection 220 adapted for guiding the battery packs 5, 7, 9 and 12. The first guide projection 220 is provided astride the abutment surface 205 and the setting surface 204, adjacent to the third connection terminal 213, and extends parallel to the longitudinal direction of the setting surface 204. A step formed on the first guide projection 220 adjacent the abutment surface 205 has a height in a direction perpendicular to the setting surface 204 slightly greater than the control projections 217, 218 to prevent possible destruction of the connection terminals 211 to 213.

The loading section 201 of the second battery loading portion 8 is further integrally formed with a second guide projection 222, astride the setting surface 204 and the abutment surface 205, as shown in FIG. 22, for guiding the loading direction of the battery packs 5, 7, 9, 12. The loading section 201 of the second battery loading portion 8 is also integrally formed on both lateral sides in the width-wise direction thereof with control pawls 224, 224 engageable in the control grooves 37, 120, 132 and 196 of the battery packs 5, 7, 9 and 12. The control pawls 224, 224 are parallel to the setting surface 204, while being parallel to the longitudinal direction of the setting surface 204. At a mid portion of the setting surface 204 of the loading section 201 of the second battery loading portion 8 is integrally formed a discriminating projection 226 which is engageable in the discriminating recesses 30, 113, 137, 190 of the battery packs 5, 7, 9 and 12.

The discriminating projection 226 is of a width $W_3$ which is larger than the width $W_1$ of the discriminating projection 73 of the first battery loading portion 6 in the direction parallel to the width of the setting surface 204. This discriminating projection 226 is slightly smaller than the width $W_0$ of the discriminating recesses 30, 113, 137, 190 of the battery packs 5, 7, 9 and 12, and hence can be inserted into the discriminating recesses 30, 113, 137, 190. The discriminating projection 226 is formed at a position spaced a distance $L_2$ from the abutment surface 205 which is larger than the distance $L_1$ by which the discriminating projection 73 of the first battery loading portion 6 is spaced from its corresponding abutment surface.

The loading section 201 of the second battery loading portion 8 is provided with a lock mechanism 228 for holding the loaded battery packs 5, 7, 9 and 12. The lock mechanism 228 includes a lock member 230 having a lock pawl 232 engageable with lock recesses 38, 121, 146, 197 of the battery packs 5, 7, 9 and 12, and an operating lever 231 for actuating this lock member 230. The lock pawl 232 extends movably through an opening 234 formed in the setting surface 204.

If the first to fourth battery packs 5, 7, 9 and 12 are loaded in the above-described second battery loading portion 8, the battery packs are verified to be appropriate and loaded if the discriminating projection 226 is received in the discriminating recesses 30, 113, 137, 190. If the battery plate 11, verified to be inappropriate, is loaded in the second battery loading portion 8, the step of the first guide projection 220 presses against the planar surface of the first guide groove 167 of the battery plate 11 to render insertion of the battery plate 11 impossible. Also, since the width $W_2$ of the discriminating recess 163 of the battery plate 11 is smaller than the width $W_3$ of the discriminating projection 226, the discriminating projection 226 cannot be inserted into the discriminating recess 163, thereby verifying that the battery plate 11 is inappropriate. Therefore, only the battery plate 11 is verified to be non-loadable in the second battery loading portion 8.

A third battery loading portion, in which can be loaded the battery packs 5, 7, 9 and 12 and the battery plate 11, is now explained by referring to the drawings.

Figure 23:
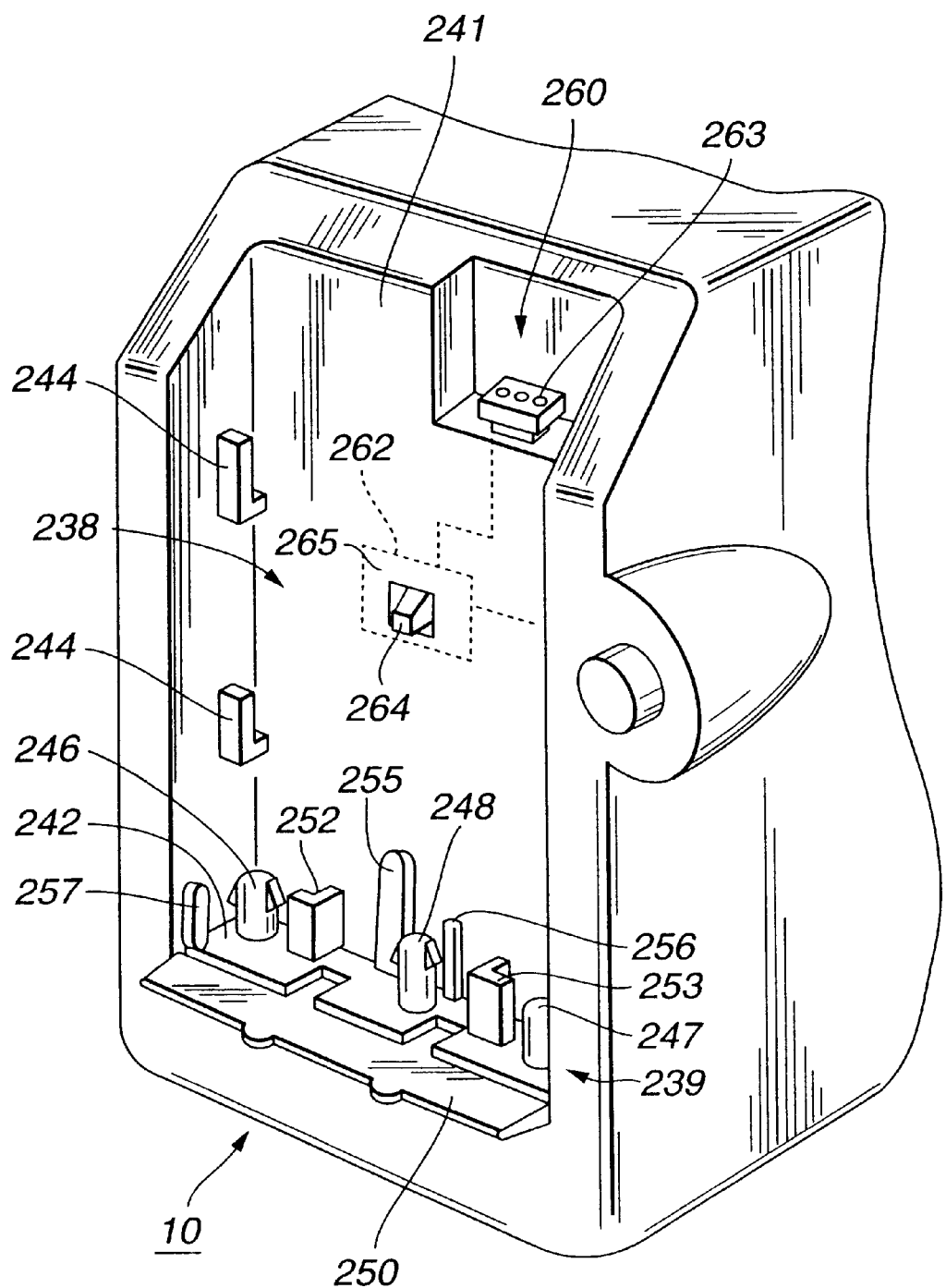
FIG. 23 is a perspective view showing a third battery loading portion.

Referring to FIG. 23, the third battery loading portion 10 includes a loading section 238 having a setting surface 241 on which to set the battery packs 5, 7, 9 and 12 and the battery plate 11, and a terminal section 239 to which are connectable the output terminals 21 to 23, 105 to 107, 128 to 130, and 181 to 183 of the battery packs 5, 7, 9, 12, and the output terminals 153 to 155 of the battery plate 11.

On both width-wise lateral sides of the loading section 238 are formed guide projections 244, adjacent to the setting surface 241, for engaging in the guide grooves 26, 109, 132, 185 and 157 of the battery packs 5, 7, 9, 12 and the battery plate 11, respectively.

The terminal section 239 is arranged on an abutment surface 242 of the battery loading portion adapted to face the front surfaces 20, 103, 126 and 176 of the battery packs 5, 7, 9, 12 and the front surface 150 of the battery plate 11, and includes first, second and third connection terminals 246 to 248 to which are connectable output terminals 21 to 23, 105 to 107, 128 to 130, 181 to 183 and 153 to 155 of the battery packs 5, 7, 9, 12 and the battery plate 11. In the terminal section 239, a cover member 250 for protecting the connection terminals 246 to 248 is arranged for rotation with respect to the loading section 238, as shown in FIG. 23.

The loading section 238 of the third battery loading portion 10 is integrally formed with a pair of control projections 252, 253 in positions substantially symmetrical with respect to the width-wise centerline of the setting surface 241, as shown in FIG. 23. The control projections 252, 253 are formed astride the abutment surface 242 and the setting surface 241 so as to be engageable with the control recesses 28, 29, 111, 112, 134, 135, 187, 188, 160, 161 of the battery packs 5, 7, 9, 12 and the battery plate 11. These control projections 252, 253 are at a slightly greater height in a direction perpendicular to the setting surface 241 than the outer periphery of the connection terminals 246 to 248 to prevent destruction of the connection terminals 246 to 248.

The loading section 238 of the third battery loading portion 10 is also integrally formed with a first guide projection 255 astride the setting surface 241 and the abutment surface 242, adjacent to the third connection terminal 248. The first guide projection 255 is adapted to guide the loading of the battery packs 5, 7, 9, 12 and the battery plate 11.

The loading section 238 of the third battery loading portion 10 is further integrally formed with a second guide projection 256 astride the setting surface 241 and the abutment surface 242, and extending parallel to the longitudinal direction of the setting surface 241, as shown in FIG. 23. The second guide projection 256 is adapted for guiding the loading direction of the battery packs 5, 7, 9, 12 and the battery plate 11. On both lateral sides in the width-wise direction of the loading section 238 of the third battery loading portion 10 are integrally formed control pawls 257, 257 engageable in the control grooves 37, 120, 132, 196, 169 of the battery packs 5, 7, 9, 12 and the battery plate 11. The control pawls 257, 257 are formed parallel to the setting surface 241 and parallel to the longitudinal direction of the setting surface 241. Meanwhile, the loading section 238 of the third battery loading portion 10 does not include a discriminating projection engageable in the discriminating recesses 30, 113, 137, 190, 163 of the battery packs 5, 7, 9, 12 and the battery plate 11. Thus, the battery packs 5, 7, 9, 12 and the battery plate 11 can be set on the setting surface 241 of the third battery loading portion 10.

The loading section 238 of the third battery loading portion 10 is provided with a lock mechanism 260 for holding the loaded battery packs 5, 7, 9, 12 and the loaded battery plate 11. The lock mechanism 260 includes a lock member 262 having a lock pawl 264 engageable in first lock recesses 38, 121, 146, 197, 171 formed in the battery packs 5, 7, 9, 12 and the battery plate 11, and an operating lever 263 for causing the movement of the lock member 262. The lock pawl 264 extends movably through an opening 265 formed in the setting surface 241.

The above-described third battery loading portion 10 is not formed with discriminating projections insertable into the discriminating recesses 30, 113, 137, 190, 163 so that, when the battery packs 5, 7, 9, 12 and the battery plate 11 are loaded thereon, the loading is determined to be appropriate. Moreover, since there is no step formed on the first guide projection 255 of the third battery loading portion 10, it is insertable into the first guide groove 167 of the battery plate 11 so that the loading of the battery plate 11 is appropriate.

A fourth battery loading portion 13 in which can be loaded only the above-described fourth battery pack 12, is explained by referring to the drawings.

Figure 24:
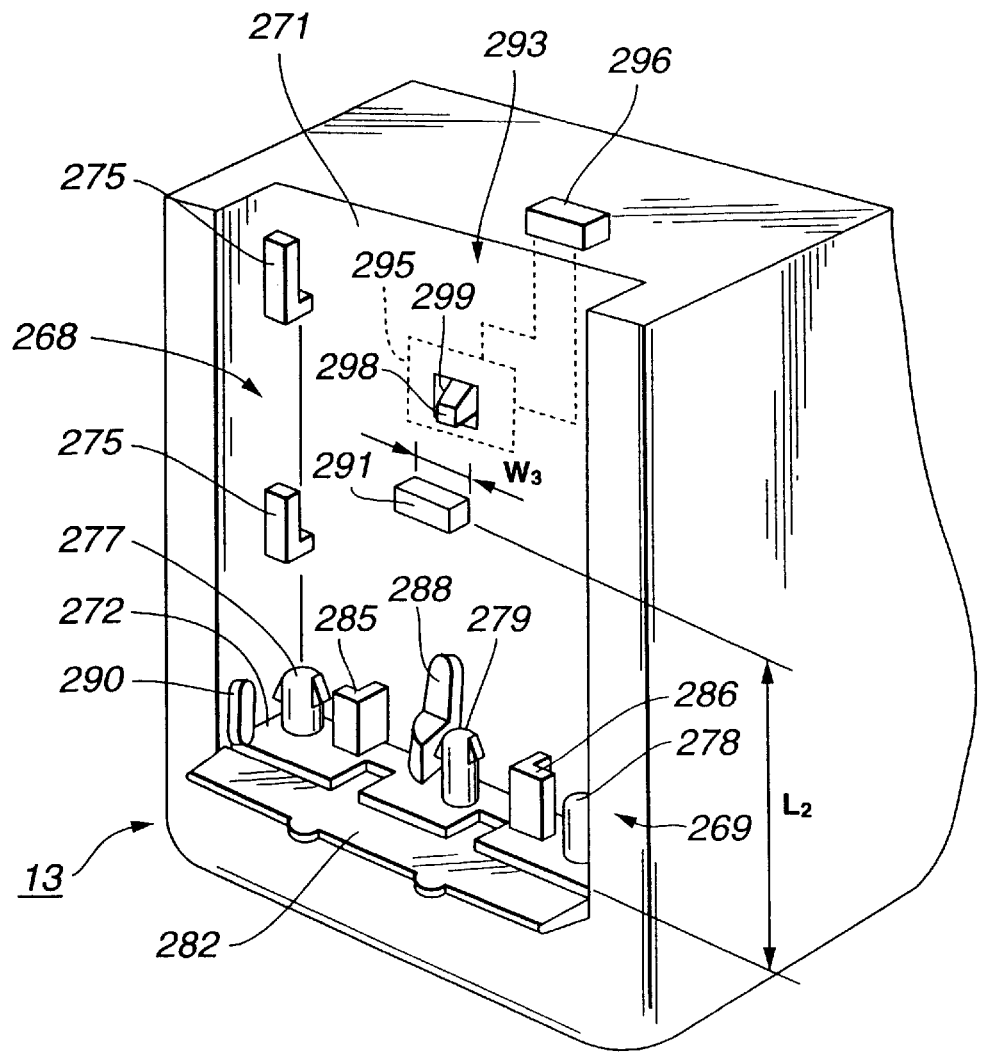
FIG. 24 is a perspective view showing a fourth battery loading portion.

The fourth battery loading portion 13 includes a loading section 268 having a setting surface 271 on which to set the fourth battery pack 12, and a terminal section 269 to which are connectable the respective output terminals 181 to 183 of the fourth battery pack 12, all as shown in FIG. 24. The loading section 268 is formed with guide projections 275 on both lateral sides in the width-wise direction thereof, adjacent to the setting surface 271, for engaging in the respective guide grooves 185 of the fourth battery pack 12.

The terminal section 269 is provided on an abutment surface 272 of the battery loading portion adapted to face the front surface 176 of the fourth battery pack 12, and includes first to third connection terminals 277 to 279 to which are connectable the output terminals 181 to 183 of the fourth battery pack 12. A cover member 282 for protecting the connection terminals 277 to 279 is mounted on the terminal section 269 for rotation relative to the loading section 268, as shown in FIG. 24.

The loading section 268 of the fourth battery loading portion 13 is integrally formed with a pair of control projections 285, 286, astride the abutment surface 272 and the setting surface 271, for engaging in the control recesses 187, 188 of the fourth battery pack 12. These control projections 285, 286 are at a greater height in a direction perpendicular to the setting surface 271 than the outer periphery of the connection terminals 277 to 279 to prevent destruction of the connection terminals 277 to 279.

The loading section 268 of the fourth battery loading portion 13 is also integrally formed with a first guide projection 288 astride the abutment surface 272 and the setting surface 271, adjacent to the third connection terminal 279. The first guide projection 288 is adapted to guide the loading of the fourth battery pack 12 in a direction parallel to the longitudinal direction of the setting surface 271. The first guide projection 288 is formed with a step adjacent to the abutment surface 272 and extending in a direction perpendicular to the setting surface 271. This step has a height slightly greater than the control projections 285, 286 to prevent possible destruction of the connection terminals 277 to 279.

On both lateral sides in the width-wise direction of the loading section 268 of the fourth battery loading portion 13 there are integrally formed control pawls 290, 290 engageable in the control grooves 196, 196 of the fourth battery pack 12. The control pawls 290, 290 are formed parallel to the setting surface 271 and parallel to the longitudinal direction of the setting surface 271. At a mid portion of the setting surface 271, the loading section 268 of the fourth battery loading portion 13 is integrally formed with a discriminating projection 291 engageable in the discriminating recess 190 of the fourth battery pack 12.

The discriminating projection 291 has a width $W_3$ which is larger than the width $W_1$ of the discriminating projection 73 of the first battery loading portion 6 in the direction parallel to the width of the setting surface 271. The discriminating projection 291 is formed at a position spaced a distance $L_2$ from the abutment surface 272 which is larger than the distance $L_1$ by which the discriminating projection 73 of the first battery loadingportion 6 is spaced from its corresponding abutment surface.

The loading section 268 of the fourth battery loading portion 13 is provided with a lock mechanism 293 for holding the loaded fourth battery pack 12. The lock mechanism 293 includes a lock member 295 having a lock pawl 298 engageable in a lock recess 197 of the fourth battery pack 12, and an operating lever 296 for causing movement of the lock member 295. This lock pawl 298 extends movably through an opening 299 formed in the setting surface 271.

If the fourth battery pack 12 is loaded in the above-described fourth battery loading portion 13, the discriminating projection 291 will be inserted into the discriminating recess 190, whereby the fourth battery pack 12 is verified to be appropriate and loaded.

If the first to third battery packs 5, 7 and 9 and the battery plate 11, verified to be inappropriate, are loaded erroneously in the fourth battery loading portion 13, the control projection 286 will be pressed against the front surfaces 20, 103, 126, 150 of the casings 19, 101, 124, 149 to prevent the insertion of the battery packs 5, 7 and 9 or the battery plate 11, whereby the first to third battery packs 5, 7 and 9 and the battery plate 11 are verified to be inappropriate and cannot be loaded.

Finally, the first battery loading portion 6 permits the loading only of the first battery pack 5 and the battery pack 11, while the second to fourth battery packs 7, 9, 12 are verified to be inappropriate. If the first battery pack 5 and the battery plate 11 are loaded in the first battery loading portion 6, the discriminating projection 73 and the discrimination lug 74 will be inserted into the discriminating recesses 30, 163 so that the first battery pack 5 and the battery plate 11 are verified to be appropriate and loaded.

If the second battery pack 7, verified to be inappropriate, is loaded in the first battery loading portion 6, the discrimination lug 74 of the discriminating projection 73 abuts the discriminating projection 116 of the discriminating recess 113 to demonstrate that it cannot be inserted. Therefore, the second battery pack 7 is verified to be inappropriate and non-loadable. If the third battery pack 9, verified to be inappropriate, is loaded on the first battery loading portion 6, the discrimination lug 74 of the discriminating projection 73 abuts the discriminating projection 139 of the discriminating recess 137 to demonstrate the non-loadability, so that the third battery pack 9 is verified to be inappropriate and non-loadable.

The battery packs 5, 7, 9, 12 and the battery plate 11 are configured to be loaded in a variety of battery loading portions which may be provided on the video camera apparatus 1. Alternatively, the battery packs 5, 7, 9, 12 and the battery plate 11 may be loaded on an illumination device mounted on the video camera apparatus 1. This illumination device, on which the battery packs 5, 7, 9, 12 and the battery plate 11 may be loaded, is now explained by referring to the drawings.

Figure 25:
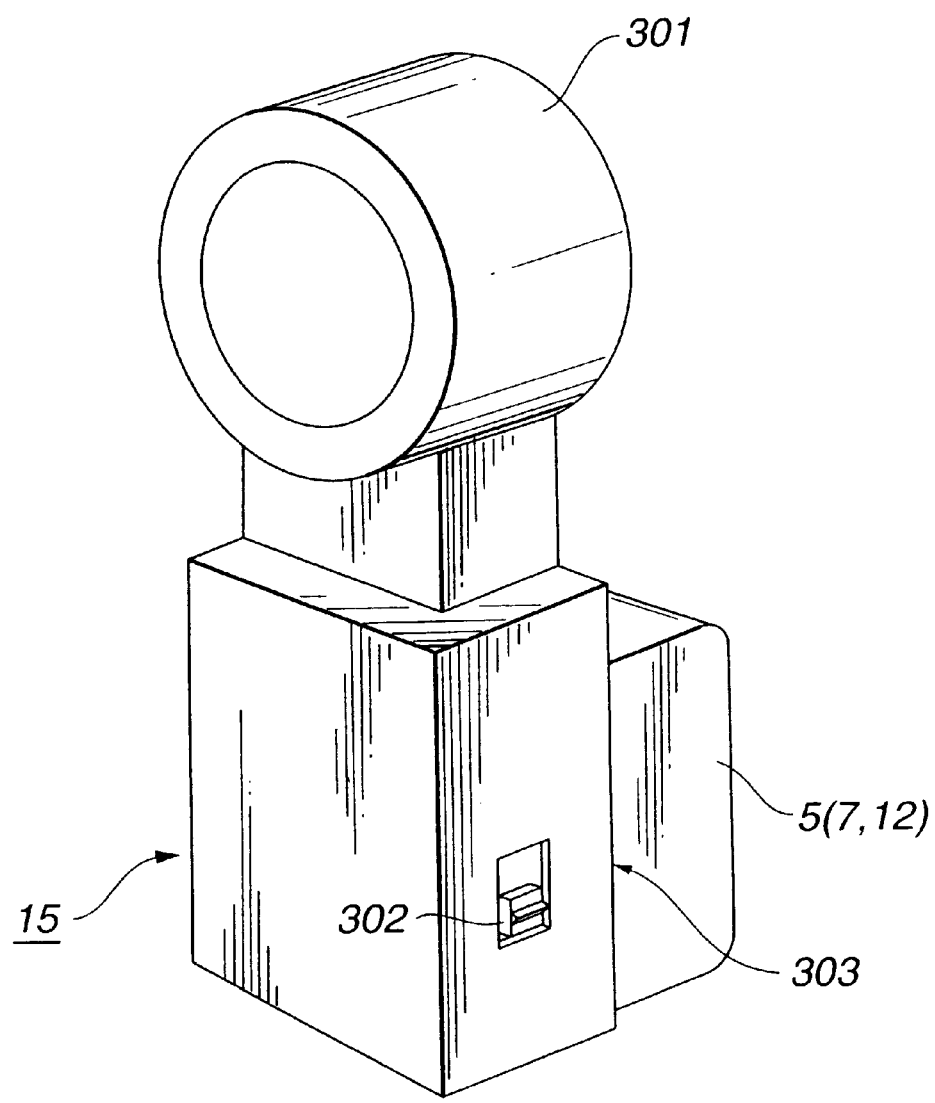
FIG. 25 is a perspective view showing a first illumination device.
Figure 26:
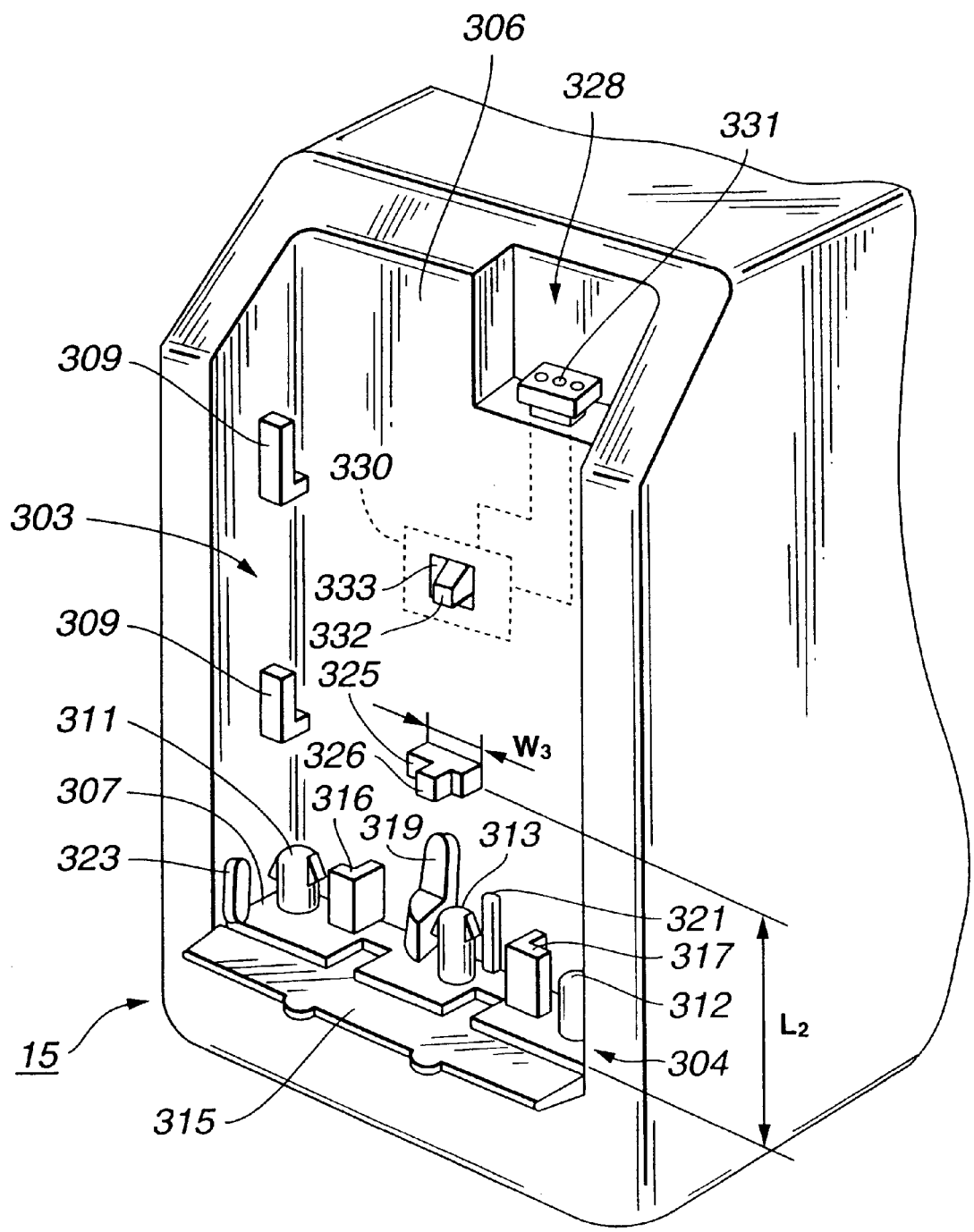
FIG. 26 is a perspective view showing a loading portion of the first illumination device.

Referring to FIGS. 25 and 26, a first illumination device 15 includes an illumination unit 301 for illuminating an object, a changeover switch 302 for switching the operating state of the illumination unit 301, a loading unit 303 on which the first and second battery packs 5, 7 can be loaded, and a terminal unit 304 to which are connectable output terminals 21 to 23 and 105 to 107 of the battery packs 5 and 7.

The loading unit 303 is provided with guide projections 309 engageable with guide grooves 26, 109 of the battery packs 5, 7, as shown in FIG. 26. The guide projections 309 are provided on both lateral sides in the width-wise direction of the setting surface 306 adjacent to the setting surface 306.

The terminal unit 304 is provided on an abutment surface 307 facing the front surfaces 20, 103 of the loaded battery packs 5, 7, and includes first to third connection terminals 311 to 313 to which are connectable the output terminals of the battery packs 5, 7. A cover member 315 for protecting the connection terminals 311 to 313 is mounted for rotation relative to the loading unit 303, as shown in FIG. 26.

The loading unit 303 of the first illumination device 15 is provided with a pair of control projections 316, 317 positioned substantially symmetrical relative to the centerline in the width-wise direction of the setting surface 306, as shown in FIG. 26. The control projections 316, 317 are integrally formed with the loading unit 303 astride the abutment surface 307 and the setting surface 306 so as to be engageable with the control recesses 28, 29, 111, 112 of the battery packs 5, 7. The control projections 316, 317 are at a greater height in a direction perpendicular to the setting surface 306 than the outer periphery of the connection terminals 311 to 313 to prevent destruction of the connection terminals 311 to 313.

The loading unit 303 of the first illumination device 15 is also integrally formed with a first guide projection 319 for guiding the loading of the battery packs 5, 7 in a direction parallel to the longitudinal direction of the setting surface 306. The first guide projection 319 is formed astride the abutment surface 306 and the setting surface 307 adjacent to the third connection terminal 313. A step projects from the first guide projection 319 in a direction perpendicular to the setting surface 306 and adjacent to the abutment surface 307. This step has a height in a direction perpendicular to the setting surface 306 which is slightly higher than the control projections 316, 317 to prevent the destruction of the connection terminals 311 to 313.

The loading unit 303 of the first illumination device 15 is further integrally formed with a second guide projection 321 extending in the longitudinal direction of the setting surface 306, as shown in FIG. 26. The second guide projection 321 is formed astride the setting surface 306 and the abutment surface 307 for guiding the loading of the battery packs 5, 7. The loading unit 303 of the first illumination device 15 is integrally formed with control pawls 323, 323 on both width-wise lateral sides thereof for engaging the control grooves 37, 120 of the battery packs 5, 7. The control pawls 323, 323 are parallel to the setting surface 306 and to the longitudinal direction of the setting surface 306. At a mid portion of the setting surface 306 of the loading unit 303 of the first illumination device 15 is integrally formed a discriminating projection 325 which is engageable in the discriminating recesses 30, 113 of the battery packs 5, 7. The distal end of the discriminating projection 325 is integrally formed with a discriminating projection 326.

This discriminating projection 325 is of a width $W_3$ larger than the width $W_1$ of the discrimination projection 73 of the first battery loading portion 6 in the direction parallel to the width of the setting surface 306. The discriminating projection 325 is formed at a position spaced a distance $L_2$ from the abutment surface 307 which is larger than the distance $L_1$ by which the discriminating projection 73 of the battery loadingportion 6 is spaced from its corresponding abutment surface.

The loading unit 303 of the first illumination device 15 is provided with a lock mechanism 328 for holding the loaded battery packs 5, 7. The lock mechanism 328 includes a lock member 330 having a lock pawl 332 engageable in the first lock recesses 38, 121 of the battery packs 5, 7, and an operating lever 331 for causing the movement of the lock member 330. The lock pawl 332 extends movably through the opening 333 formed in the setting surface 306.

If the first, second or fourth battery packs 5, 7, 12 are loaded in the loading unit 303 of the first illumination device 15, the discriminating projection 325 will be inserted into the discriminating recesses 30, 113, 190 to demonstrate that the first, second and fourth battery packs are verified to be appropriate and loaded.

If the third battery pack 9, verified to be inappropriate, is erroneously loaded in the loading unit 303 of the first illumination device 15, the discriminating projection 326 of the discriminating projection 325 will press against the discriminating recess 140 of the discriminating projection 139 in the discriminating recess 137, demonstrating that battery pack 9 cannot be inserted therein. Thus, the third battery pack 9 is verified to be inappropriate and non-loadable.

If the battery plate 11, verified to be inappropriate, is erroneously loaded in the loading unit 303 of the first illumination device 15, the step on the first guide projection 319 will abut on the planar surface of the first guide groove 167 of the battery plate 11, and thus demonstrate that the battery plate 11 cannot be inserted therein. Moreover, since the width $W_2$ of the discriminating recess 163 of the battery plate 11 is smaller than the width $W_3$ of the discriminating projection 325, the discriminating projection 325 cannot be inserted into the discriminating recess 163. Thus, the battery plate 11 is verified to be inappropriate and non-loadable.

Therefore, the loading unit 303 of the first illumination device 15 is configured so that the high capacity type first battery pack 5 and the standard type second and fourth battery packs 7, 12 can be loaded thereon. Since the illumination unit 301 of the first illumination device 15 consumes much power, the third battery pack 9 having a lower charging capacity and the battery plate 11 are verified to be inappropriate.

Referring to the drawings, a second illumination device 17, having a larger illumination volume than that of the above-described first illumination device 15, is now explained.

Figure 27:
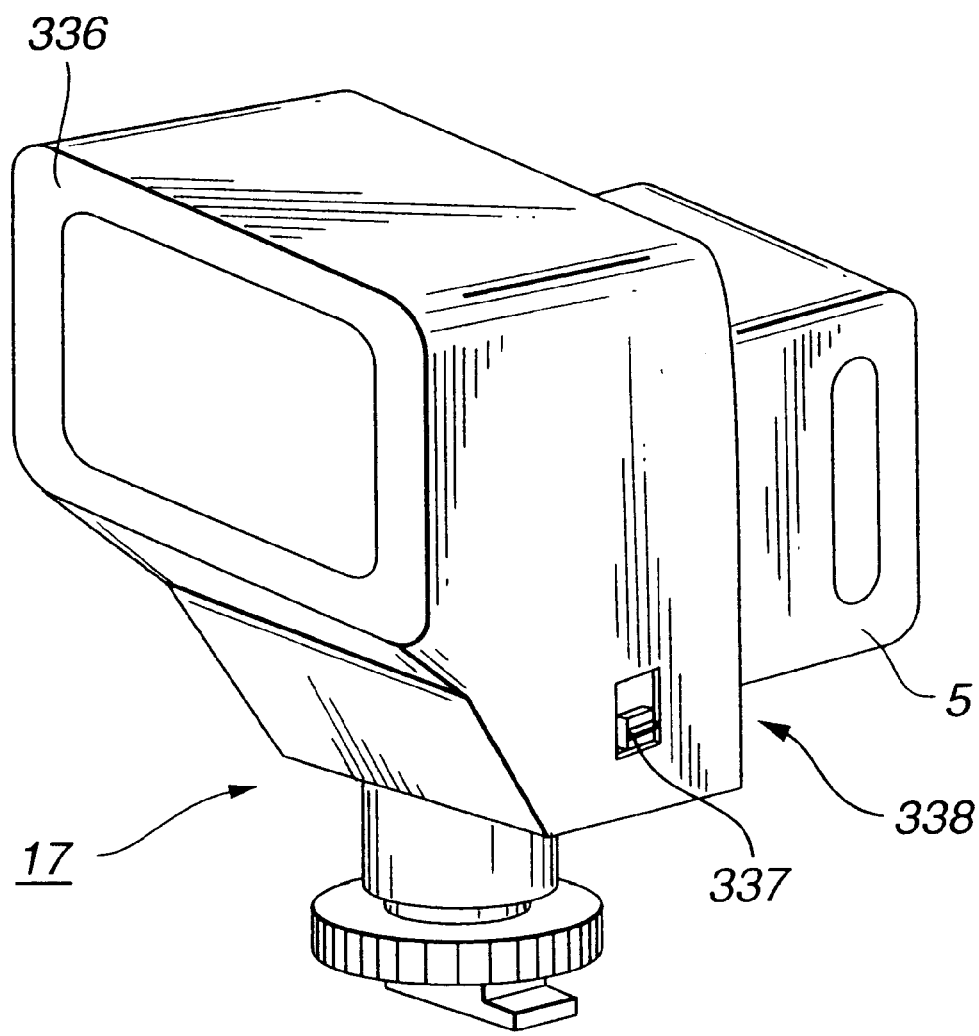
FIG. 27 is a perspective view showing a second illumination device.
Figure 28:
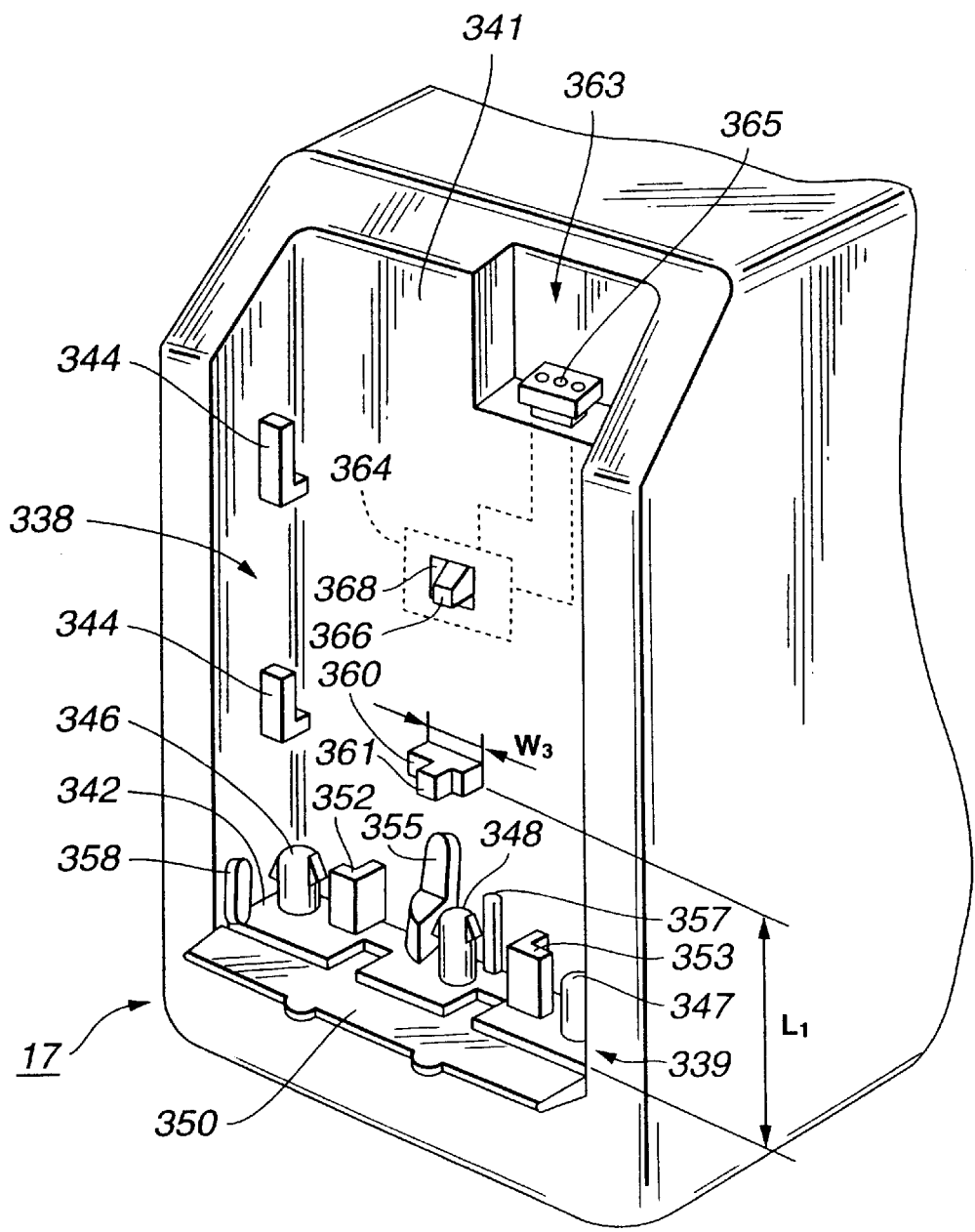
FIG. 28 is a perspective view showing a loading portion of the second illumination device.

The second illumination device 17, shown in FIGS. 27 and 28, includes an illumination unit 336 for illuminating an object, a changeover switch 337 for changing over the operating state of the illumination unit 336, a loading section 338 in which the first battery pack 5 may be removably loaded, and a terminal unit 339 to which are connectable the output terminals 21 to 23 of the first battery pack 5.

On both lateral sides in the width-wise direction of the setting surface 341 and adjacent to the setting surface, as shown in FIG. 28, there are formed guide projections 344 engageable in the guide grooves 26 of the first battery pack 5.

The terminal unit 339 is arranged on the abutment surface 342 facing the front surface 20 of the loaded first battery pack 5, and includes first to third connection terminals 346 to 348 to which are connectable the output terminals 21 to 23 of the first battery pack 5. The terminal unit 339 is also provided with a cover member 350 which may rotate relative to the loading section 338 for protecting the connection terminals 346 to 348, as shown in FIG. 28.

The loading section 338 of the second illumination device 17 is integrally formed with a pair of control projections 352, 353 positioned substantially symmetrical with respect to the centerline in the width-wise direction of the setting surface 341. The control projections 352, 353 are formed astride the abutment surface 342 and the setting surface 341 so as to be engageable in the control recesses 28, 29 of the first battery pack 5. These control projections 352, 353 are at a greater height in the direction perpendicular to the setting surface 341 than the outer periphery of the connection terminals 346 to 348 to prevent possible destruction of the connection terminals 346 to 348.

The loading section 338 of the second illumination device 17 is integrally formed with a first guide projection 355 for guiding the loading of the first battery pack 5 parallel to the longitudinal direction of the setting surface 341. The first guide projection 355 is provided astride the abutment surface 342 and the setting surface 341 adjacent to the third connection terminal 348. This first guide projection 355 is formed with a step adjacent to the abutment surface 342 and projecting in a direction perpendicular to the setting surface 341. This step has a height in a direction perpendicular to the setting surface 341 which is slightly higher than the control projections 352, 353 to prevent possible destruction of the connection terminals 346 to 348.

The loading section 338 of the second illumination device 17 is also integrally formed with a second guide projection 357 extending parallel to the longitudinal direction of the setting surface 341. The second guide projection 357 is formed astride the setting surface 341 and the abutment surface 342 for guiding the loading of the first battery pack 5. On both width-wise lateral sides of the loading section 338 of the second illumination device 17 are formed control pawls 358, 358 engageable in the control groove 37 of the first battery pack 5. The control pawls 358, 358 are parallel to the setting surface 341 and to the longitudinal direction of the first battery pack 5. At a mid portion of the setting surface 341 of the loading section 338 of the second illumination device 17 is integrally formed a discriminating projection 360 engageable in the discriminating recess 30 of the first battery pack 5. The distal end of the discriminating projection 360 is integrally formed with a discriminating projection 361.

The discriminating projection 360 has a width $W_3$ which is larger than the width $W_1$ of the discrimination projection 73 of the first battery loading portion 6. The discriminating projection 360 is formed at a position spaced a distance $L_1$ from the abutment surface 342 which is smaller than the distance $L_2$ by which the discriminating projection 325 of the first illumination device 15 is spaced from its corresponding abutment surface.

The loading section 338 of the second illumination device 17 is provided with a lock mechanism 363 for holding the loaded first battery pack 5. The lock mechanism 363 includes a lock member 364 having a lock pawl 366 engageable in the first lock recess 38 of the first battery pack 5, and an operating lever 365 for causing movement of the lock member 364. The lock pawl 366 extends movably through an opening 368 formed in the setting surface 341.

If the first or second battery pack 5 or 12 is loaded in the loading section 338 of the above-described second illumination device 17, the discriminating projection 360 will be inserted into the discriminating recesses 30, 190 to demonstrate that the first and second battery packs 5, 12 are appropriate for loading into position in the loading section 338.

If the second battery pack 7, verified to be inappropriate, is loaded in the loading section 338 of the second illumination device 17, the discriminating projection 361 of the discriminating projection 360 will press against the discriminating projection 116 of the discriminating recess 113 to prevent the insertion. Thus, the second battery pack 7 is verified to be inappropriate and non-loadable. On the other hand, if the third battery pack 9, verified to be inappropriate, is loaded on the second illumination device 17, the discriminating projection 361 of the discriminating projection 360 will press against the discriminating projection 139 of the discriminating recess 137 to prevent the insertion. Thus, the third battery pack 9 is verified to be inappropriate and non-loadable. Also, if the battery plate 11, verified to be inappropriate, is loaded in the loading section 338 of the second illumination device 17, the step on the first guide projection 355 will press against the planar surface of the first guide groove 167 to prevent the insertion. Moreover, since the width $W_2$ of the discriminating recess 163 of the battery plate 11 is smaller than the width $W_3$ of the discriminating projection 360, the discriminating projection 360 cannot be inserted into the discriminating recess 163. Thus, the battery plate 11 is verified to be inappropriate and non-loadable. Therefore, only the high capacity type first and fourth battery packs 5, 12 can be loaded in the loading section 338 of the second illumination device 17.

With the battery loading mechanism according to the present invention, the discriminating recesses 30, 113, 137, 190 of the battery packs 5, 7, 9, 12; discriminating grooves 32, 115, 138, 191 in the discriminating recesses 30, 113, 137, 190; discriminating projections 116, 139 of the battery packs 7, 9; discriminating recess 140 of battery pack 9; discriminating projections 73, 226, 291, 325, 360 of the battery loading portions 6, 8, 13, 15, 17; and the discriminating projections 74, 326 and 361 of discriminating projections 73, 325, 360 are used for discrimination, so that it is possible to develop various shapes conforming to plural specifications. Since it suffices in this battery loading mechanism to suitably modify only the shape of the discriminating recesses and the discriminating projections, it is unnecessary to manufacture new metal molds for different battery packs having different specifications, making it possible to minimize the manufacturing cost of these metal molds.

It should be noted that, although the battery pack according to the present invention includes a battery cell having a chargeable secondary battery, this is merely illustrative since the battery pack can be configured to exchangeably hold primary dry batteries. Moreover, although the battery loading portion according to the present invention is configured to be incorporated on a video camera or an illumination device, it may also be incorporated on other electronic equipment, such as a charging device used for charging the battery pack.

What is claimed is:

1. A battery loading system, comprising
a plurality of battery packs, each of said plurality of battery packs having a casing, each of said casings having a length extending in a longitudinal direction and a width extending in a first direction substantially transverse to said longitudinal direction; and
a battery loading portion adapted to receive selected ones of said plurality of battery packs in an assembled position;
said battery loading portion in an assembly orientation having a length extending in said longitudinal direction and a width extending in said first direction, and including a receiving surface and a discrimination projection member protruding outwardly from said receiving surface, said discrimination projection member having a predetermined dimension extending in said first direction;
said casing of each of said plurality of battery packs having a bottom surface, said bottom surface having a discrimination recess disposed therein, said discrimination recess including a bottom surface formed with a discriminating groove located substantially on a widthwise centerline of said bottom surface of said discrimination recess, said discrimination projection member being insertable in said discrimination recess in said selected ones of said plurality of battery packs and not being insertable in said discrimination recess in a group of said battery packs other than selected ones such that only said selected ones of said plurality of battery packs are loadable in said assembled position on said battery loading portion.

2. The battery loading system as claimed in claim 1, wherein said discrimination recess in each of said plurality of battery packs extends in said longitudinal direction between a first end and a second end when in said assembly orientation, each said discrimination recess in said group of said battery packs having a dimension in said first direction greater than said predetermined dimension, and having an interfering member having one end abutting said first end of said discrimination recess and a distal end spaced from said second end of said discrimination recess, said interfering member preventing said discrimination projection member from being insertable in said discrimination recess in each of said battery packs in said group of said battery packs.

3. The battery loading system as claimed in claim 2, wherein said battery loading portion has a first end, said discrimination projection member being positioned a selected distance from said first end of said battery loading portion, said first end of each said discrimination recess in said group of said battery packs in said assembly orientation being spaced from said first end of said battery loading portion by a distance less than said selected distance and said second end of each said discrimination recess in said group of said battery packs in said assembly orientation being spaced from said first end of said battery loading portion by a distance greater than said selected distance, said distal end of each said interfering member in one portion of said group of said battery packs in said assembly orientation being located at a distance from said first end of said battery loading portion greater than said selected distance, whereby said interfering member prevents said discrimination projection member from being received in said discrimination recess in each of said one portion of said group of said battery packs, and said distal end of each said interfering member in another portion of said group of said battery packs in said assembly orientation being located at a distance from said first end of said battery loading portion less than said selected distance, whereby said discrimination projection member is receivable in said discrimination recess in each of said another portion of said group of said battery packs.

4. The battery loading system as claimed in claim 1, wherein said discrimination recess in ones of said battery packs other than said selected ones of said battery packs has a dimension in said first direction less than said predetermined dimension when in an assembly orientation, said discrimination projection member not being insertable in said discrimination recess in each of said ones of said battery packs.

5. The battery loading system as claimed in claim 1, wherein said discrimination projection member includes a first end surface substantially parallel to said receiving surface at a first distance from said receiving surface, and a discrimination lug protruding from said first end surface, said discrimination lug in said assembly orientation having a dimension in said first direction less than said predetermined dimension and defining a free end surface substantially parallel to said receiving surface and spaced from said receiving surface by a distance greater than said first distance.

6. The battery loading system as claimed in claim 1, further comprising a battery plate having a portion connectable to an outlet and a bottom surface adapted to engage said receiving surface in an assembled condition of said battery plate and said battery loading portion, said bottom surface of said battery plate including a recess, said recess in said battery plate in said assembled condition having a dimension in said first direction greater than said predetermined dimension, whereby said discrimination projection member is receivable in said recess in said battery plate.

7. The battery loading system as claimed in claim 1, wherein said discrimination recess in each of said plurality of battery packs extends between first and second ends in said longitudinal direction when in an assembly orientation and said discriminating groove includes ends that co-terminate with said first and second ends of said discrimination recess.

8. The battery loading system as claimed in claim 7, wherein said discrimination projection member has a substantially rectangular profile, said discrimination projection member having a distal end on which is formed a discrimination lug which is engageable in said discriminating groove of said discrimination recess.

9. A power source loading system, comprising a plurality of power sources; and a loading portion adapted to receive selected ones of said plurality of power sources and having a length in a longitudinal direction and a width in a first direction substantially transverse to said longitudinal direction, said loading portion including a first end, a receiving surface and a shaped member projecting outwardly from said receiving surface, said shaped member having a predetermined dimension in said first direction;

said plurality of power sources each having a bottom surface adapted to engage said receiving surface in an assembled position of said power source and said loading portion, and a recess formed in said bottom surface, said recess in said selected ones of said power sources in said assembled position having a dimension in said first direction greater than said predetermined dimension;

said recess in each of said plurality of power sources in an assembly orientation extending in said longitudinal direction between first and second ends; and said shaped member being positioned between said first and second ends of said recess of one of said power sources in said assembled position indicating that said one of said power sources is one of said selected ones of said power sources suited to said loading portion, and said shaped member not being positioned between said first and second ends of said recess of another of said power sources indicating that said another of said power sources is not one of said selected ones of said power sources and is not suited to said loading portion.

10. A battery pack, comprising:

a casing having a front surface and a bottom surface, said bottom surface having a length extending in a longitudinal direction and a width extending in a first direction orthogonal to said longitudinal direction;

a first discrimination recess formed in said bottom surface, said first discrimination recess extending in said longitudinal direction between a first end and a second end, said first discrimination recess having a bottom surface formed with a substantially rectangular first discrimination groove at substantially a width-wise centerline of said casing, said first discrimination groove having ends that co-terminate with said first and second ends of said first discrimination recess;

an output terminal arranged on said front surface of said casing; and a battery cell contained in said casing, said battery cell having an output electrically connected to said output terminal.

11. The battery pack as claimed in claim 10, further comprising a first guide groove formed in said bottom surface, said first guide groove extending in said longitudinal direction and having a first end terminating in said front surface of said casing and a second end that is a continuation of said first discrimination recess.

12. The battery pack as claimed in claim 11, further comprising a second guide groove formed in said bottom surface and located a fixed distance from said first guide groove in said first direction, said second guide groove extending in said longitudinal direction and having an open end formed in said front surface of said casing and a terminating end formed in said bottom surface.

13. The battery pack as claimed in claim 11, further comprising a second discrimination groove formed in said bottom surface adjacent to said first guide groove, said second discrimination groove extending in said longitudinal direction and having an open end formed in said front surface of said casing and a terminating end formed in said bottom surface.

14. The battery pack as claimed in claim 11, further comprising a discrimination lug integrally formed in said first discrimination recess, said discrimination lug extending in said longitudinal direction from said first end of said first discrimination recess toward a free end spaced from said second end of said first discrimination recess.

15. The battery pack as claimed in claim 10, further comprising first and second control recesses, said control recesses being located on said bottom surface on opposite sides of said width-wise centerline and at substantially equal distances from said width-wise centerline and having a substantially L-shaped cross-section extending from an opening in said front surface of said casing for a fixed distance in said longitudinal direction away from said front surface.

* * * * *